(12) United States Patent
Kuroiwa

(10) Patent No.: US 7,336,302 B2
(45) Date of Patent: Feb. 26, 2008

(54) FRAME MEMORY DEVICE AND METHOD WITH SUBSAMPLING AND READ-OUT OF STORED SIGNALS AT LOWER RESOLUTION THAN THAT OF RECEIVED IMAGE SIGNALS

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 635 days.

(21) Appl. No.: 10/762,316

(22) Filed: Jan. 23, 2004

(65) Prior Publication Data
US 2005/0062860 A1 Mar. 24, 2005

Related U.S. Application Data

(63) Continuation of application No. 09/019,559, filed on Feb. 6, 1998, now abandoned, which is a continuation-in-part of application No. 08/806,712, filed on Feb. 27, 1997, now abandoned.

(60) Provisional application No. 60/032,117, filed on Dec. 5, 1996, now abandoned.

(30) Foreign Application Priority Data

| Feb. 29, 1996 | (JP) | ................................. 8-042513 |
| Feb. 7, 1997 | (JP) | ................................. 9-025063 |

(51) Int. Cl.
- H04N 9/68 (2006.01)
- H04N 3/14 (2006.01)
- H04N 5/335 (2006.01)
- G06K 9/32 (2006.01)

(52) U.S. Cl. .................. 348/237; 348/280; 348/424.1; 348/444; 348/716; 382/299

(58) Field of Classification Search .............. 348/222.1, 348/230.1, 234, 237, 266, 272, 273, 280, 348/424, 425, 439, 443, 444, 445, 458, 714, 348/715, 716, 424.1, 426.1; 358/539, 426, 358/432, 451; 382/298, 299
See application file for complete search history.

(56) References Cited

U.S. PATENT DOCUMENTS 4,703,514 A    10/1987   Van der Wal ................ 358/447

(Continued)

*Primary Examiner*—John M. Villecco
(74) *Attorney, Agent, or Firm*—Miles & Stockbridge P.C.

(57) ABSTRACT

A frame memory device is employed in a digital camera, for example, to output raster-scanned digital color image signals at lower resolution than that of original image signals. The order of sequentially received original raster-scanned digital color image signals is rearranged, and the rearranged signals are sequentially stored in a memory having a two-dimensional address structure such that vertical addresses represent the order of entry of respective scan lines that constitute the image signals and horizontal addresses represent the order of entry of respective signals that belong to each of the scan lines. The stored rearranged signals are subsampled and read out while skipping horizontal and vertical addresses of the memory at regular intervals. The image signals may comprise $YC_BC_R$ color signals having a sampling ratio of 4:2:2. Sequentially received C signals in the order of $C_B \rightarrow C_R \rightarrow C_B \rightarrow C_R$, for example, are rearranged in the order of $C_B \rightarrow C_B \rightarrow C_R \rightarrow C_R$. Scanning frequencies of image signals generated in the raster-scan scheme can be made equal to those of NTSC or PAL television signals for convenient display of image signals on a television monitor.

8 Claims, 19 Drawing Sheets

U.S. PATENT DOCUMENTS

| | | | |
|---|---|---|---|
| 4,719,503 A | 1/1988 | Craver et al. | 348/717 |
| 4,965,662 A | 10/1990 | Shiota | 348/588 |
| 5,412,428 A | 5/1995 | Tahara | 348/396 |
| 5,598,514 A | 1/1997 | Purcell et al. | 395/118 |
| 5,701,157 A | 12/1997 | Kato et al. | 348/240 |
| 5,706,049 A | 1/1998 | Moghadam et al. | 348/333 |
| 5,706,290 A | 1/1998 | Shaw et al. | 370/465 |
| 5,726,707 A | 3/1998 | Sakurai et al. | 348/222 |
| 5,734,427 A * | 3/1998 | Hayashi | 348/458 |
| 5,745,186 A | 4/1998 | Shimizu et al. | 348/562 |
| 5,754,234 A | 5/1998 | Kitsuki et al. | 348/394 |
| 5,793,379 A * | 8/1998 | Lapidous | 382/298 |
| 5,844,617 A | 12/1998 | Faroudja et al. | 348/441 |
| 5,880,941 A | 3/1999 | Yanagihara et al. | 348/474 |
| 5,937,085 A | 8/1999 | Ishida | 382/162 |
| 6,335,760 B1 * | 1/2002 | Sato | 348/443 |
| 6,867,803 B1 * | 3/2005 | Funamoto | 348/272 |

* cited by examiner

FIG. 5

| | 0 | 1 | 2 | 3 | 4 | 5 | 6 | 7 |
|---|---|---|---|---|---|---|---|---|
| 0 | Cb00 | Cb02 | Cr00 | Cr02 | Cb04 | Cb06 | Cr04 | Cr06 |
| 1 | Cb10 | Cb12 | Cr10 | Cr12 | Cb14 | Cb16 | Cr14 | Cr16 |
| 2 | Cb20 | Cb22 | Cr20 | Cr22 | Cb24 | Cb26 | Cr24 | Cr26 |
| 3 | Cb30 | Cb32 | Cr30 | Cr32 | Cb34 | Cb36 | Cr34 | Cr36 |

HORIZONTAL ADDRESS →

VERTICAL ADDRESS →

STORAGE ADDRESS OF Cb AND Cr SIGNAL (C MEMORY)

FIG 7

| | 0 | 1 | 2 | 3 | |
|---|---|---|---|---|---|
| 7 | Cr07 | Cr17 | Cr27 | Cr37 | |
| 6 | Cb06 | Cb16 | Cb26 | Cb36 | |
| 5 | Cr06 | Cr16 | Cr26 | Cr36 | |
| 4 | Cb05 | Cb15 | Cb25 | Cb35 | |
| 3 | Cr05 | Cr15 | Cr25 | Cr35 | |
| 2 | Cb04 | Cb14 | Cb24 | Cb34 | |
| 1 | Cr04 | Cr14 | Cr24 | Cr34 | |
| 0 | Cb03 | Cb13 | Cb23 | Cb33 | |

HORIZONTAL ADDRESS ↑

STORAGE ADDRESS OF Cb AND Cr SIGNAL (C MEMORY)

VERTICAL ADDRESS →

FIG. 11

| G | B | G | B | G | B | G | B | G |
|---|---|---|---|---|---|---|---|---|
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |

SINGLE DISC COLOR FILTER HAVING BAYER ARRANGEMENT

SAMPLING COORDINATES OF YCbCr    4:2:2
IMAGE SIGNAL

SAMPLING COORDINATES OF YCbCr 4:1:1
IMAGE SIGNAL

STORAGE ADDRESS OF Y SIGNAL (Y MEMORY)

IN THIS CASE, n IS INTEGER

STORAGE ADDRESS OF $C_B$ AND $C_R$ SIGNAL (C MEMORY)

FRAME MEMORY DEVICE AND METHOD WITH SUBSAMPLING AND READ-OUT OF STORED SIGNALS AT LOWER RESOLUTION THAN THAT OF RECEIVED IMAGE SIGNALS

CROSS-REFERENCE TO RELATED APPLICATIONS

This application is a continuation of application Ser. No. 09/019,559 filed Feb. 6, 1998 now abandoned (incorporated herein by reference) which is a continuation-in-part of application Ser. No. 08/806,712 filed Feb. 27, 1997 now abandoned which claims the benefit of Provisional Application Ser. No. 60/032,117 filed Dec. 5, 1996 now abandoned.

BACKGROUND OF THE INVENTION

1. Field of the Invention

The present invention relates to a frame memory device which receives raster-scanned digital image signals representing a frame of image, stores the image signals in a memory, and reads out the image signals from the memory while subsampling, so as to output raster-scanned image signals at lower resolution than the original image received.

2. Related Background Art

In recent years, the need for handling digital images has been increasing. This is largely attributable to the fact that digitalization has grown in such applications as image data base, DTP, photographic printing, and image transmission, and also to the fact that hardware for handling digital images has been and is being developed. More particularly, image input devices such as scanners, image output devices such as full-color printers and high resolution color monitors, mass storage devices such as optical discs, and personal computers are becoming highly efficient, and easily available at reduced cost. For instance, image input devices such as digital cameras have become available, that include two-dimensional CCD area sensors and that are able to capture motion pictures in real time. The need for handling digital images is expected to increase dramatically in the future, not only in business applications but also in individual or personal fields such as hobbies.

Frame memory devices are often used in handling digital images. For example, where one frame of television signals is to be recorded as a digital still picture in a low-speed memory device, such as an optical disc, digitalized television signals are first stored in a high-speed frame memory device, and the image signals are read out at a low speed from the frame memory device and recorded in the optical disc, as known in the art. Where a recorded still picture is to be displayed on a television monitor, the recorded image signals are read out at a low speed from the optical disc and stored in the high-speed frame memory device, and then are repeatedly read out from the frame memory device at a television signal rate so that the still picture is displayed on the television monitor. The high-speed frame memory device serves as a buffer which, in the above example, provides adjustment between high-speed input and output of television signals, and low-speed input and output of television signals, to and from optical discs.

Frame memory devices are often used in digital still cameras. Signals produced by a two-dimensional CCD area sensor must be read out at a relatively high speed so as not to be degraded. While the output signals of this CCD sensor are initially digitalized to provide high-speed digital image signals, it is difficult to record these high-speed digital image signals without compressing them, and it is difficult to perform real time complicated image compression processing of these high-speed digital image signals, in accordance with a JPEG system, for example. Even if high-speed operations are feasible for recording or compression processing of the signals, it is still advantageous to operate relevant circuits at a low speed so as to ensure timing margins and reduce the current consumed. To address these problems, frame memory devices are used in digital still cameras. More particularly, high-speed digital signals are first stored in a frame memory device, and these signals are then read out at a relatively low speed so as to facilitate recording or image compression processing. Furthermore, where image compression is performed using two paths, so as to control a compressed data volume (code length) to b equal to or smaller than a prescribed value, the original image signals must be compressed twice, which necessitates the use of a frame memory device.

Frame memory devices are used not only for recording image signals during photographing but also for reproducing a photographed still picture and displaying it on a television monitor. Image signals recorded in a main memory medium of the camera are read out and stored in a frame memory device, after being expanded or decompressed in the case of compressed images, or without such processing in the case of non-compressed images, so that television signals of a still picture are generated by repeatedly reading out these stored signals. If a camera does not have a frame memory device, image signals must be read out from the main memory medium and output at a television signal rate after being expanded in real time in the case of compressed images or without being expanded in the case of non-compressed images. This is not an easy matter. Moreover, this reproduction process must be wastefully repeated so as to continuously display the reproduced image on the television monitor. However, if the camera is equipped with a frame memory device, the reproduction process needs to be effected only once, and thereafter the reproduced image signals are merely repeatedly read out from the frame memory device.

FIG. 8 is a block diagram showing one example of a digital still camera equipped with a frame memory device. The operation of this camera will now be briefly explained.

A light beam received through a photographing lens 10 from an object forms an image on CCDs 11. During photographing, image light is photoelectrically converted into electric analog image signals, which are then output from the CCDs 11 and converted into digital signals by means of an A/D converter 12. The digital signals are subjected to various processings, such as color separation, pixel interpolation, γ compensation, white balance adjustment, contour compensation, and color conversion, that are performed by a signal processing circuit (not shown), so as to provide raster-scanned signals in a predetermined format, which are then sequentially stored in a frame memory 1. Once the signals corresponding to one picture frame are stored, these signals are sequentially read out and transmitted to a compression/expansion circuit 13, and subjected to image compression processing when the camera is in a compression recording mode, 80 that compressed image signals are recorded in a recording medium in the form of a memory card 15, through an I/F (interface) circuit 14. When the camera is in a non-compressed recording mode, the above compression processing is not executed by the compression/ expansion circuit 13, and the input signals are output to the I/F circuit 14 as they are, and recorded in the memory card 15.

During reproduction, image signals recorded in the memory card 15 are read out, and transmitted to the compression/expansion circuit 13 through the I/F circuit 14. The compressed image is expanded and decoded by the circuit 13, and the thus expanded image signals are sequentially stored in the frame memory 1. A non-compressed image is not subjected to expansion processing in the compression/ expansion circuit 13, and the transmitted signals are stored as they are in the frame memory 1. The image signals stored in the frame memory 1 are read out in a raster scanning scheme at a television signal rate, and converted into analog image signals by a D/A converter 16. Thereafter, the analog image signals are processed by a signal processing circuit (not shown) into television signals, such as NTSC or PAL, which are then output from a video output terminal 17 to a television monitor 18 so that the reproduced image is displayed on the monitor.

A control circuit 9 is adapted to control operations of the camera as a whole, and respective blocks inside the camera, and includes a CPU for controlling operation sequences, a ROM that stores programs to perform the sequences, clock generators for generating clocks needed for the respective blocks inside the camera, and a signal generating circuit for supplying control signals. A display device 19 provides display of various information, such as the number of frames that have been photographed, the number of remaining frames, the frame number of the reproduced image, shutter time, and aperture, as well as various kinds of error and alarm messages. A mode selector switch 21 effects switching between a photographing mode and a reproduction mode, and switching between a compress d recording mode and a non-compressed recording mode when a picture is taken. A release switch 22 directs the camera to initiate photographing, and a frame-advance switch 20 selects an image that is to be reproduced.

FIG. 9 shows details of a frame memory portion of the camera of FIG. 8, that includes only the frame memory 1 and a portion of the control circuit 9 assigned to control the frame memory 1. Frame memory controller 2 is adapted to control writing, read-out and refreshing of the frame memory 1. Frame memory 1 and the controller 2 constitute a frame memory device. In FIG. 8, the frame memory controller 2 is incorporated in the control circuit 9.

Next, a brief explanation will be provided with respect to the block diagram of FIG. 9.

The frame memory controller 2 has four kinds of buses, and receives and generates image signals through these buses in various operation modes. The first bus is a video bus through which the input and output of raster-scanned image signals take place. The frame memory controller 2 receives the image signals through this bus when image data are sent from the A/D converter 12 during photographing, and outputs the image signals to the D/A converter 16 during reproduction of an image. Although separate buses for input and output are illustrated in FIG. 8 for the sake of clarity, these buses may be integrated into a single two-way video bus as shown in FIG. 9 (and this is the case in general). The raster-scanned signals input and output through the video bus are accompanied by horizontal synchronizing signals, vertical synchronizing signals and clocks for transferring the image signals. In the following description, the input and output of the raster-scanned image signals through the video bus will be called "video input/output". Writing means 3 shown in FIG. 9 is a means for writing the video-input image signals into the frame memory 1. Read-out means 8 is a means for reading out the image signals stored in the frame memory 1 for video-output of the signals.

The second bus is a memory bus to which the frame memory 1 is connected. The image signals received through any of the other three buses are eventually written into the frame memory 1 through this bus. The image signals stored in the frame memory 1 are read out through this bus and output through any of the other three buses. The image signals transmitted through the memory bus are accompanied by control signals for writing and read-out of the frame memory 1 and address signals.

The third bus is a compression/expansion bus. Image signals are transmitted to the compression/expansion circuit 13 through this bus when they are compressed, and received from the compression/expansion circuit 13 through this bus when they are expanded and decoded. Where the compression/expansion circuit 13 is a JPEG circuit, the image signals are input and output in a block unit of 64 pixels (8 horizontal×8 vertical). For many commercially available JPEG LSIs, this bus allows the input and output of data in synchronization with clock pulses. The manner of data input and output-depends on what kind of circuit is used as the compression/decompression circuit 13. Accordingly, the compression/decompression bus of the frame memory controller 2 must be compatible with the compression/decompression circuit 13.

The fourth bus is a host bus through which the host CPU sends commands and parameters to the controller 2 and receives status information therefrom so as to actuate or start the frame memory controller 2 and switch the operating modes. Further, in some cases, the host CPU may be able to write or read out image signals into or from the frame memory 1 through this bus.

FIG. 10 generally illustrates addresses of the frame memory 1 in which the image signals entered through the video bus will be stored. The frame memory 1 generally has a two-dimensional address structure having vertical addresses and horizontal addresses so as to store raster-scanned image signals. The vertical addresses correspond to scan lines of the image signals, and the horizontal addresses correspond to signals that belong to each scan line. This two-dimensional address structure is not necessarily a physical two-dimensional address structure, but may be a logical one, as will be explained later.

In FIG. 10, the upper portion of the figure represents low-order or subordinate vertical addresses and the lower portion represents high-order or superordinate vertical addresses, while the left portion of the figure represents low-order or subordinate horizontal addresses and the right portion represents high-order or superordinate horizontal addresses. The downward and rightward arrows shown outside the rectangles in FIG. 10 indicate directions (increasing directions) toward superordinate vertical and horizontal addresses, respectively. The raster-scanned image signals are stored such that scan lines entered earlier are stored in the low-order or subordinate vertical addresses, and scan lines entered later are stored in the high-order or superordinate vertical addresses, and such that signals that belong to each scan line and entered earlier are stored in the low-order horizontal addresses, and signals entered later are stored in the high-order horizontal addresses. Since the raster-scanned image signals are usually obtained by scanning an image from the upper side to the lower side of an image plane, and also from the left side to the right side of the image plane, the vertical position of the address shown in FIG. 10 coincides with the vertical position of the image signal in the actual image plane.

The raster-scanned image signals are stored at respective addresses of the frame memory in the orders indicated by arrows inside the rectangles of FIG. 10. More specifically, the signals belonging to one scan line are given a fixed vertical address, and written into the memory in the order of entry, with the horizontal address being incremented by one after each stored entry. When the scan line proceeds to the next one, the vertical address is incremented by one, and signals belonging to the next scan line are stored in an area of the new vertical address in the same manner as in the previous scan line. Storage of the signals equivalent to one frame is accomplished by repeating this procedure from the first scan line to the last scan line. Where the image signals are entered in an interlace scan mode, the vertical address is incremented by two rather than by one, so that signals in odd-numbered fields and signals in even-numbered fields are respectively stored. FIG. 10 shows the manner in which the image signals are stored in the non-interlace scan mode, and the manner in which the image signals are stored in the interlace scan mode.

When the image signals stored in the frame memory 1 are generated again as raster-scanned signals from the video bus, those signals stored earlier can be first read out according to the order of the arrows shown internally of the rectangles in FIG. 10. If the output signals are to be arranged in the interlace scan scheme, the signals are read out with the vertical address being incremented by two as in the case of storage of these signals.

The width of the video bus and memory bus, the number of lines required for transmitting control signals, the order of input and output of respective color signal components and other detailed specifications are varied depending upon the format of an image signal described later. As for the format of the image signal, a $YC_BC_R$ image signal is often used to represent a color image in the case of a digital still camera, since the $YC_BC_R$ image signal requires a reduced amount of data to be handled as compared with a RGB image signal. Although Y signals do not affect the data amount, $C_B$ and $C_R$ signals require a smaller band than the RGB image signal, resulting in a reduced number of pixels required (hereinafter $C_B$ and $C_R$ signals will be referred to as C signals). Therefore, even in the case where a limited number of pixels is provided, as in single disc color CCDs, the pixels can be effectively utilized, and, when image compression is performed, image data can be compressed with increased efficiency.

In a single disc color filter having a so-called Bayer arrangement as shown in FIG. 11, for example, a large number of pixels is assigned to G components which have the greatest influence on Y signals that govern the resolution, whereas smaller numbers of pixels are assigned to B and R components for producing C signals. This color filter is characterized in that the G components are arranged checker-wise, whereas the B and R components are placed in phased positions. Further, the B and R components are respectively disposed in alternate lines, that is, in every other line. Thus, the ratio of the number of pixels is G:B:R=2:1:1.

The $YC_BC_R$ signal is generally obtained from the RGB signal (or vice versa) according to the following arithmetic expressions:

$$Y=0.299R+0.587G+0.114B \qquad (1)$$

$$C_B=B-Y \qquad (2)$$

$$C_R=R-Y \qquad (3)$$

It should be noted that the respective color signals that appear in the right sides of the above expressions ①, ② and ③ must be of values defined by coordinates in the same space. In the case of single disc color CCDs having the Bayer arrangement, however, each pixel can have only one kind of color signal. In order to obtain the $YC_BC_R$ image signal for each pixel according to the above expressions, values of the two other kinds of color signals that are not present in the relevant pixel must be known. To this end, the values of the color signals that are lacking can be obtained by effecting pixel interpolation in an appropriate method. While the $YC_BC_R$ image signal can be obtained by performing such signal processing, the following two kinds of signals are actually employed in many operations.

4:2:2 Signal

The number of pixels having Y signals is the same as that of a CCD as counted in the horizontal and vertical directions (in the case of the Bayer arrangement, the number of pixels of Y signals is twice that of G components).

The number of pixels having C signals is half the number of pixels of Y signals as counted in the horizontal direction, and is the same as the number of pixels of Y signals in the vertical direction (both $C_B$ signals and $C_R$ signals are present in all lines).

Sampling coordinates of the color components are shown in FIG. 12, where ○ indicates a point where all of Y, $C_B$ and $C_R$ signals are present, and • indicates a point where only Y signal is present.

4:1:1 Signal

The number of pixels of Y signals is the same as the number of pixels of a CCD as counted in both the horizontal and vertical directions (in the case of the Bayer arrangement, the number of pixels of Y signals is twice that of pixels of G components).

The number of pixels of C signals is half the number of pixels of Y signals as counted in both the horizontal and vertical directions (both $C_B$ signals and $C_R$ signals are present in the same lines, and these lines are placed alternately).

Sampling coordinates of the color components are shown in FIG. 13. In FIG. 13, ○ indicates a point where all of Y, $C_B$ and $C_R$ signals are present, and • indicates a point where only Y signal is present.

While the Y signal has a positive value, since R, G, B have positive values, the C signal may have a positive or negative value. The peak and bottom levels of the Y signal are equal to those of the R, G, B color components according to the expression ①. The peak and bottom levels of the C signal are positive and negative values, respectively, whose absolute values are equal to each other (the middle value is 0), according to the expressions ①, ② and ③. The digital values of these signals are determined depending upon which numerical values are given to the reference levels (black level and peak white level of Y signal, 0 and peak or bottom level of C signal).

In the case of an 8-bit $YC_BC_R$ image signal, two kinds of values as indicated below are often used.

Where the image signal is entered for use in a personal computer,

Y: 0-255

$C_B$: 1-255 (128 corresponds to 0.)

$C_R$: 1-255 (128 corresponds to 0.)

Where the image signal is used as a digital television signal,

Y: 16-235 (0 and 255 are regarded as synchronizing signals.)
$C_B$: 16-242 (128 corresponds to 0.)
$C_R$: 16-240 (128 corresponds to 0.)

There will next be described the manner in which raster-scanned $YC_BC_R$ image signals each having 8 bits are received from and transmitted to the video bus. The video bus may consist of a Y bus for 8-bit Y signals, and a C bus similarly for 8-bit C signals (16 bits in total), and the Y signals and C signals (16-bit signals) are input and output in parallel with each other through the respective buses, as shown in FIG. 14. The $C_B$ signals and $C_R$ signals flowing through the C bus are multiplexed such that a $C_B$ signal appearing in one pixel is followed by a $C_R$ signal in the next pixel. Since the number of lines of Y signals is the same as that of C signals in the 4:2:2 signals, input and output of all of the lines are conducted with 16 bits. In the case of 4:1:1 signals, on the other hand, C signals are only present in every other line, and there are lines where the input and output of only Y signals (8-bit signals) take place. It is to be noted, however, that 4:1:1 signals are often produced by skipping every other line of 4:2:2 signals when the signals are stored in the memory, that is, 4:2:2 signals are received from the video bus, and some lines are skipped when the signals are written into the memory. Upon output of the signals, line interpolation is performed so as to generate the signals as 4:2:2 signals from the video bus. The signals on the video bus are assumed to be 4:2:2 signals in the following description.

When a signal sampled at sampling points as shown in FIG. 12 is input and output in a raster scan mode, it is appropriate to multiplex the $C_B$ signals and $C_R$ signals such that a $C_B$ signal in one pixel is followed by a $C_R$ signal in the next pixel, as shown in FIG. 14. The number appended to each signal, as seen in $Y_0, Y_1, \ldots, C_{B0}, C_{R0} \ldots$, corresponds to the horizontal sampling coordinate shown in FIG. 12, and is also related to the order of input and output of the signal and its storage address in the frame memory. Since the signals shown in FIG. 14 do not belong to any specific scan line, the number that corresponds to the vertical sampling coordinate, the order of scan lines, and the vertical storage address in the frame memory are not appended to each signal.

When 16-bit signals are input and output through the video bus, a 16-bit memory bus is needed to enable real-time writing/reading of these signals into/from the memory. With the memory bus also divided into a Y bus and a C bus, Y signals and C signals are prevented from being mixed in the memory. The frame memory 1 may be assumed to consist of independent Y memory and C memory. Where a memory device having a 16-bit bus is used, for example, the Y memory and C memory are physically the same memory, but may be considered as logically separate memories since high-order or superordinate bytes and low-order or subordinate bytes are independent of each other. Where two memory devices each having an 8-bit bus are used, on the other hand, the Y memory and C memory are physically as well as logically separate memories. The difference between a one memory device with a 16-bit bus and two memory devices with 8-bit buses is that the address signals of the two memories are the same as or different from each other. The same address signals are used for high-order bytes and low-order bytes in the one memory device with the 16-bit bus, whereas different address signals are used in two physically separate memory d vices. In an ordinary frame memory device, however, the address signals of the Y memory and C memory are derived from a common source. Thus, there is no difference in the device as a whole between one memory device and two memory devices.

The use of the same address signals in the Y memory and C memory does not cause any operational inconvenience or problems, since it is only at the time of video input/output that signals must be simultaneously written into and read out from the Y memory and C memory. During video input/output, signals are merely entered into or generated from the Y memory and C memory in parallel with each other in the order shown in FIG. 14, and therefore the same addresses can be used in the Y memory and C memory without causing any problem or inconvenience. If writing/reading can be separately performed with respect to the individual color signals, the addresses of the Y memory and C memory need not be independent of each other. It is to be noted, however, that while data are written into one of the Y memory and C memory, no data should be written into the other memory, and thus write-enable signals must be separately set in these memories. In a memory device with a 16-bit bus, write-enable signals are usually separately present in the high-order bytes and low-order bytes, thus avoiding problems. On the other hand, common read-enable signals may be used in the Y memory and C memory, since either one of the Y signal and C signal that are simultaneously read out may be discarded if it is considered unnecessary. In the ordinary frame memory device wherein the address signals and read-enable signals of the Y memory and C memory are derived from common sources while the write-enable signals are derived from separate sources for these memories, the number of signal lines does not increase undesirably, and the size of the device can be accordingly reduced.

The compression/expansion bus and host bus may usually be 8-bit buses. While the image signals are processed in a block unit of 64 pixels (8 horizontal×8 vertical) in the JPEG compression/expansion mode as described above, the signals of one block must be composed of the same color signal components. Thus, an 8-bit compression/expansion bus may be used without causing a problem, to allow input and output of single color signal components during processing of at least one block. This fact also justifies the use of common address signals in the Y memory and C memory.

When a color image is processed in the JPEG compression/expansion mode, the processing may take place successively, plane by plane, for each of color signal components, or may be conducted while switching the color signal components each time a certain number of blocks are processed. The former case is called non-interleave, and the latter case is called block interleave. Where $YC_BC_R$ 4:2:2 image signals are compressed according to the JPEG system, block interleave is often used in which a unit (called MCU) of four blocks, Y, Y, $C_B$, $C_R$, is repeatedly processed in this order.

As later described, it is advantageous if the frame memory device that permits input and output of $YC_BC_R$ 4:2:2 image signals is generally constructed as shown in the block diagram of FIG. 15. First there will be a general discussion of a frame memory 1 that stores these image signals.

With the development of highly integrated memory devices in recent years, a large-capacity memory, such as a frame memory for storing images, can now be easily realized. However, it is not easy to construct a compact frame memory. Although SRAM, which operates at a high speed with one-dimensional addresses and need not be refreshed, can be easily used, its capacity is not as large as DRAM, and thus the frame memory is often constituted by DRAMs.

Since the frame memory is required to read/write high-speed signals as in the above-described video input/output, a high-speed page mode is usually used when DRAM is used as the memory device. If the high-speed page mode is used, those signals that belong to one scan line are stored in an area of the same ROW address. These signals are then sequentially stored in the order of entry from low-order COLUMN addresses toward high-order COLUMN addresses. When a scan line proceeds to the next one, the ROW address is updated. The update of the ROW address is usually conducted during a horizontal blanking period since an overhead time occurs upon update of the ROW address. Thus, two-dimensional addresses that correspond to raster scanning are used in the DRAM, wherein the ROW addresses correspond to vertical addresses and COLUMN addresses correspond to horizontal addresses.

While logical two-dimensional addresses can be considered in the case of SRAM, physical two-dimensional addresses are not present in SRAM. Since SRAM originally has one-dimensional addresses, it has an advantage that the number of horizontal addresses can be freely chosen even when two-dimensional addresses are considered. Accordingly, only a reduced waste of the memory occurs when an image whose number of effective horizontal pixels is not $2^N$ (N is positive integer) is stored. Where DRAM is used in the high-speed page mode, on the other hand, the number of COLUMN addresses is uniquely determined due to the presence of physical two-dimensional addresses. When the number of effective horizontal pixels is smaller than the number of COLUMN addresses, therefore, a redundant portion of the COLUMN addresses becomes a wasted area that is not used. In addition, DRAM needs to be refreshed, and such refreshing is usually effected utilizing a horizontal blanking period in the case of video input/output. Where DRAM is used as the frame memory device in the above manner, a high-performance frame memory controller is needed for performing the necessary controls. A specific method for using DRAM to provide the frame memory will be described hereinafter.

As an example, storage of an image of 640 horizontal× 480 vertical pixels (VGA) requires the DRAM to provide at least 480 ROW addresses and at least 640 COLUMN addresses. In many cases, however:

$$\text{Number of ROW addresses} \geq \text{Number of COLUMN addresses.} \qquad (4)$$

Thus, the memory needs to be constructed in some fashion so as to reduce the above-described redundant portion of the COLUMN addresses and the number of DRAMs. For example, 4:2:2 $YC_BC_R$ image signals can be stored in VGA size with high efficiency if two 4M-bit DRAMs each having 512 ROW×512 COLUMN addresses and a bus width of 16 bits are used. In this case, the number of COLUMN addresses is doubled, i.e., increased to 1024 by using two DRAMs, whereby the $YC_BC_R$ image signal (4:2:2) of 640 horizontal×480 vertical pixels can be stored. COLUMN addresses 0-511 are present in the first DRAM, and COLUMN addresses 512-1023 are present in the second DRAM. In this case, COLUMN addresses 640-1023 and ROW addresses 480-511 become a wasted area that is not used.

There will next be explained how the 4:2:2 $YC_BC_R$ image signals are stored in the frame memory 1. As described above, raster-scanned image signals entered through the video bus are generally stored at respective addresses in the order indicated by the arrows inside the rectangles of FIG. 10. It follows from this fact, as well as the manner of signal input from the video bus as shown in FIG. 14 and the structure of the frame memory as shown in FIG. 15, that the $YC_BC_R$ 4:2:2 image signals are stored in the frame memory at addresses as shown in FIG. 16. $Y_{mn}$ represents a Y signal stored in an address of the Y memory 6 where ROW (vertical)=m and COLUMN (horizontal)=n. $C_B$ and $C_R$ signals are represented in a similar manner. In FIG. 16, m=0 corresponds to the first line (top line) and n=0 corresponds to the pixel in the first column (the leftmost column). In this case, the first address is 0 in both the horizontal and vertical directions, as in many frame memory devices, but it is not necessarily required to be 0. Since $C_B$ and $C_R$ signals are alternately entered through the C bus such that $C_B$ signal in one pixel is followed by $C_R$ signal in the next pixel, these signals are also alternately stored at successive COLUMN addresses in the C memory 7. In FIG. 16(b), $C_B$ signals are stored in even-numbered COLUMN addresses (in this case, 0 is the first COLUMN address), and $C_R$ signals are stored in odd-numbered COLUMN addresses. In this example, it will be understood that the image signals are entered from the C bus in the order of $$C_B \to C_R \to C_B \to C_R \to \ldots \qquad (5)$$

In this regard, attention should be given to sampling coordinates of $C_R$ signals. For example, $C_{Rm0}$ is stored in the ROW address of m and COLUMN address of 1, which are identical with the addresses of $Y_{m1}$. This does not mean, however, that the sampling coordinates of $C_{Rm0}$ are the same as those of $Y_{m1}$. Normally, the sampling coordinates of $C_{Rm0}$ are identical with the sampling coordinates of $Y_{m0}$ and $C_{Bm0}$, as shown in FIG. 12.

Irrespective of the fact that the respective Y, $C_B$, $C_R$ image signals are sampled on the same coordinates, $C_R$ signals are not stored in the same addresses as the other two signals, and their COLUMN addresses are shifted by 1 from those of the other signals. To multiplex the $C_B$ signals and $C_R$ signals that are sampled on the same coordinates in the order of ⑤ indicated above, the $C_R$ signals can be delayed by one sampling block with respect to the $C_B$ signals.

Development of the Invention

Recently, two-dimensional CCD area sensors having a large number of pixels have appeared. For instance, a CCD sensor has been announced that has square pixels whose effective pixel number is 1280 horizontal×1024 vertical. This CCD sensor was originally developed for use as a sensor of an image input device for computers, and is advantageously used for displaying an image on a monitor of a personal computer, rather than a television monitor. The specifications of the CCD sensor that has square pixels whose effective pixel number is 1280×1024 are compatible with an image signal format for personal computers. However, there is a need to reproduce such an image signal and output it in a normal television signal format.

A high resolution digital still camera using the above CCD may be used for entering an image into a personal computer, and may be provided with a reproduction function to permit reproduced image signals to be displayed on a conventional home television monitor, so that the photographed image can be easily confirmed. Naturally, the format of the reproduction signal generated from the camera should be compatible with that of the television monitor to be used. NTSC and PAL are typical television signal formats, and many digital still cameras are able to output reproduction signals in these television signal formats. Some of these cameras are adapted to switch between NTSC and PAL signals and output the selected signal.

There will next be considered a case where a still picture having the effective pixel number of 1280×1024 (square pixels) is to be reproduced and generated as a television signal in NTSC format. Image signals representing the still picture are stored in the frame memory device of the digital still camera provided with a video reproduction output. These signals are to be read out from the frame memory device at a rate of NTSC television signals, to provide reproduced image signals in the NTSC format. However, the effective pixel number of NTSC television signals is far smaller than 1280×1024, though it depends on the selection of sampling frequencies. In the case of square pixels, for example, the number of the pixels is about 640 in the horizontal direction×486 in the vertical direction, which is less than one fourth of an image of 1280×1024 pixels. The sampling frequency may be about 12.2727 MHz. It is apparent that an image having the effective pixel number of 1280×1024 cannot be properly reproduced in the form of NTSC signals. The image displayed would lack an area of more than ¾ of the entire image. As is understood from this, there is a need to appropriately reduce the number of pixels so as to display substantially the entire area of the image. As described hereinafter, the present invention addresses and solves this problem in an efficient manner.

An image having the effective pixel number of 1280×1024 (square pixels) can be subsampled to reduce the number of both horizontal and vertical pixels by one half, respectively. Image signals whose horizontal and vertical pixels are both reduced by one half have the effective pixel number of 640×512, which is close to the number of square pixels of NTSC television signals. Further, since the horizontal and vertical pixels are reduced at the same rate, the pixel aspect ratio measured before and after the subsampling does not change, and the square pixels retain their shape. Although the image thus subsampled lacks about 26 lines if it is reproduced in the form of NTSC television signals, an image having the correct aspect ratio can be displayed on an NTSC television monitor. Lack of about 26 lines in the image is not of great significance, and it is found easy and most convenient to subsample the image to one half.

When image signals of 1280×1024 pixels recorded on the memory card 15 are to be displayed on an NTSC television monitor, the image signals may be subsampled when read out from the memory card so that the horizontal and vertical pixels are preliminarily reduced by one half, respectively, and then stored in the frame memory 1. For television monitoring, the entire pixel data stored in the frame memory may then be merely read out from the frame memory in the order of raster scanning. On the other hand, when image signals that have been stored in the frame memory 1 during photographing are previewed for confirmation, the image signals of 1280×1024 pixels stored in the frame memory 1 must be read out from the frame memory while subsampling the image signals. Accordingly, the frame memory device must have a video output mode for subsampling the image signals.

If the image signals having the effective pixel number of 1280×1024 and stored in the frame memory 1 consist of $YC_BC_R$ 4:2:2 signals, they are stored in the addresses as shown in FIG. 16. When these $YC_BC_R$ 4:2:2 signals are subsampled to one half in the horizontal and vertical directions and generated as raster scanned signals, the signals are read out by accessing every other ROW address, and accessing the COLUMN addresses in the following orders:

$$Y_{m0} \rightarrow Y_{m2} \rightarrow Y_{m4} \rightarrow Y_{m6} \rightarrow Y_{m8} \rightarrow Y_{m10} \ldots \quad (6)$$

$$C_{Bm0} \rightarrow C_{Rm0} \rightarrow C_{Bm4} \rightarrow C_{Rm4} \rightarrow C_{Bm8} \rightarrow C_{Rm8} \ldots \quad (7)$$

When interlace scanning is performed in actual operations, ROW addresses must be accessed in the following orders.

$$\text{Odd-numbered field: } 0 \rightarrow 4 \rightarrow 8 \rightarrow 12 \rightarrow 16 \ldots \quad (8)$$

$$\text{Even-numbered field: } 2 \rightarrow 6 \rightarrow 10 \rightarrow 14 \rightarrow 18 \ldots \quad (9)$$

While the Y signals and C signals thus read out are generated in parallel with each other from the video bus, attention must be given to the phases of these signals. Although signals such as $Y_{m2}, Y_{m6}, Y_{m10} \ldots$ and signals such as $C_{Rm0}, C_{Rm4}, C_{Rm8} \ldots$ must be generated in the same phase for the corresponding signals, as shown in FIG. 14 (the signals shown in FIG. 14 are not indicated as belonging to any specific scan line, and thus "m" that represents ROW address is not shown), the COLUMN addresses of areas of corresponding Y signal and $C_R$ signal are not the same. Since the address signals in the Y memory 6 and C memory 7 are usually derived from a common source, the Y signal and C signal that are output by a single memory access are read out from the same COLUMN address. Thus, where the Y signal and $C_R$ signal are stored in different COLUMN addresses as in the above case, only one of these signals can be read out by a single memory access. Storage of $YC_BC_R$ 4:2:2 signals in the addresses shown in FIG. 16 within the frame memory involves such problems as described below.

(1) The COLUMN addresses in which $Y_{m0}$, $Y_{m4}$, $Y_8$, $Y_{m12} \ldots$ are stored are the same as the COLUMN addresses in which $C_{Bm0}, C_{Bm4}, C_{Bm8}, C_{Bm0} \ldots$, are stored and these signals are effective even after subsampling the image signals to one half. Accordingly, the corresponding two signals may be simultaneously output to the video bus by a single memory access even if the address signals of the Y memory 6 and C memory 7 are derived from a common source. $Y_{m2}, Y_{m6}, Y_{m10}, Y_{m14} \ldots$ and $C_{Rm0}, C_{Rm4}, C_{Rm8}, C_{Rm12} \ldots$ are also effective signals after subsampling the image signals to one half. However, the COLUMN addresses in which these two kinds of signals are stored are not the same, and thus the corresponding Y signal and $C_R$ signal cannot be simultaneously output by a single memory access. The memory needs to be accessed three times rather than twice so as to read out four signals in total, i.e., two Y signals, one $C_B$ signal and one $C_R$ signal.

(2) When the address signals of the Y memory and C memory are derived from a common source, it is found that the memory needs to be accessed three times to read out the above-indicated four signals. In order to output the Y signal and C signal in phase and in parallel with each other onto the video bus, the rate of reading out data from the memory must be 1.5 times the data output rate of the video bus (or greater). This is because four signals are transmitted from the video bus with two clock pulses since the Y signal and C signal are in phase, and therefore the memory access must be performed three times within the period of two clock pulses. This situation is illustrated in FIG. 17, which shows that three cycles of memory read-out clock are included in a period of two cycles of data transfer clock for the video bus, and that signals equivalent to 3 words must be read out from the memory during the time in which the signals equivalent to two words (one word being a pair of Y signal and C signal output in parallel with each other) are generated from the video bus. X marks on the memory bus represent data that are not used. The signals on the video bus are delayed with respect to the signals on the memory bus so that the Y and C signals are synchronized with each other to be simultaneously generated from the video bus in parallel with each other.

When the data transfer clock for the video output has a clock speed of 12.2727 MHz as described above, the memory read-out clock needs to have a clock speed of about 18.40911 MHz (or higher), which is 1.5 times that of the data transfer clock. However, a clock having 24.5454 MHz, that is twice the speed of the data transfer clock, is often used, as the use of the 1.5-times clock is inconvenient. Thus, the memory read-out clock and video output clock can be conveniently obtained from the same source. Where the clock whose speed is twice that of the data transfer clock for the video bus is used for reading out signals from the memory, the above-indicated four signals are read out in a period of three clock cycles (one read-out operation is performed in one clock cycle), and the remaining 1 clock cycle provides an idling time. This situation is illustrated in FIG. 18, in which four cycles of memory read-out clock are included in a period of two cycles of data transfer clock for the video bus. Of these four cycles, the initial three cycles provide a period in which signals are read out from the memory, and the last one cycle provides an idling time in which signals are not read out. It is understood that data are not present in the idling time in which signals are not read out.

When a clock having 1.5 times or twice the speed of the data transfer clock for the video bus is used for reading out data from the memory, the data are read out from the memory at a rate that is 1.5 times or twice that of (data transfer of) the video bus, thereby causing such problems as an increase in the current consumed and difficulty in controlling the operation timing.

(3) Where the address signals of the Y memory 6 and C memory 7 are derived from a common source, data must be read out from the memory at a rate that is 1.5 times or twice the rate of data output of the video bus. If the address signals of the Y memory 6 are independent of those of the C memory 7, however, different addresses may be given to the respective memories, and thus the Y signal and $C_R$ signal that are stored in different COLUMN addresses may be simultaneously read out. The above-indicated four signals can be read out by accessing the memory twice. Consequently, the memory read-out rate can be made equal to the data output rate of the video bus. However, this arrangement requires separate sets of addresses for the Y memory 6 and C memory 7, which results in increased signal lines of the memory bus. In addition, separate address generators are needed for the Y memory 6 and C memory 7, which results in an increased scale of a relevant circuit.

SUMMARY OF THE INVENTION

The present invention has been developed in the light of the above considerations. It is therefore an object of the invention to provide a frame memory device capable of easily subsampling pixels without increasing the scale of circuits, and also capable of outputting thus subsampled image signals as raster-scanned signals.

In accordance with one embodiment of the invention, in which raster-scanned digital color image signals are received, and sequentially stored in a frame memory having a two-dimensional address structure such that vertical addresses represent the order of entry of respective scan lines that constitute the image signals, and horizontal addresses represent the order of entry of respective signals that belong to each of the scan lines, and in which the stored signals are sequentially read out from the memory so as to output the signals again as raster-scanned signals, signal rearranging means rearranges the order of received signals, and subsampling and read-out means reads out the stored signals while skipping horizontal and vertical addresses of the memory at regular intervals. The rearranged image signals are stored in the memory and read out so as to output raster-scanned image signals at lower resolution than the original image signals.

In a second embodiment, wherein image signals comprise raster-scanned $YC_BC_R$ color signals having a sampling ratio of 4:2:2, in which the number of horizontal pixels of $C_B$ and $C_R$ signals is equal to one half that of Y signals, and wherein the Y signals and the $C_B$ and $C_R$ signals are input and output in parallel with each other from a Y bus and a C bus, respectively, and the Y signals and $C_B$ and $C_R$ signals of a frame of the image signals are written into and read out from a Y memory and a C memory, respectively, with the Y and C signals transmitted in parallel each other, and wherein the $C_B$ and $C_R$ signals are multiplexed at alternate pixels and input and output from the C bus in the order of $C_B \rightarrow C_R \rightarrow C_B \rightarrow C_R$, signal rearranging means rearranges the $C_B$ and $C_R$ signals in the order of $C_B \rightarrow C_B \rightarrow C_R \rightarrow C_R$ to alternate the signals for every other pixel, and the $C_B$ and $C_R$ signals rearranged by the rearranging means are synchronized with the Y signals so that the Y and C signals are respectively written into the Y memory and the C memory in parallel with each other. The subsampling and reading-out means accesses alternate ones of horizontal and vertical addresses of the Y memory and C memory to read out the Y and C signals in parallel with each other, thereby to output raster-scanned $YC_BC_R$ image signals that have been subsampled to one half in both horizontal and vertical directions by the subsampling and read-out means.

In accordance with a third embodiment, the order of input/output of $C_B$ and $C_R$ signals on a C bus and the order of $C_B$ and $C_R$ signals that are rearranged are exactly reversed with respect to those described above.

In accordance with a fourth embodiment, the horizontal scan frequency and vertical scan frequency of the image signals generated in a raster scanning scheme from the frame memory device may be equal to those of NTSC or PAL television signals.

In accordance with a fifth embodiment, horizontal and vertical addresses of a memory, such as a frame memory device, for storing image signals are respectively divided into a plurality of blocks each having a certain number (2m) of successive addresses as a unit. Then, the image signals in each block are subsampled by skipping addresses at predetermined intervals as precisely as possible, so that image signals corresponding to (2n) addresses are read out from the block.

BRIEF DESCRIPTION OF THE DRAWINGS

The invention will be further described in conjunction with the accompanying drawings, which illustrate preferred and exemplary (best mode) embodiments, and wherein:

FIG. 5 is a view showing how $C_B$ and $C_R$ signals are stored in a C memory in the frame memory of the second embodiment.

FIG. 7 is a view showing how $C_B$ and $C_R$ signals are stored in a C memory in the frame memory of the third embodiment.

FIG. 11 is a view showing a single-disc color filter having Bayer arrangement.

DESCRIPTION OF PREFERRED EMBODIMENTS

Figure 1:
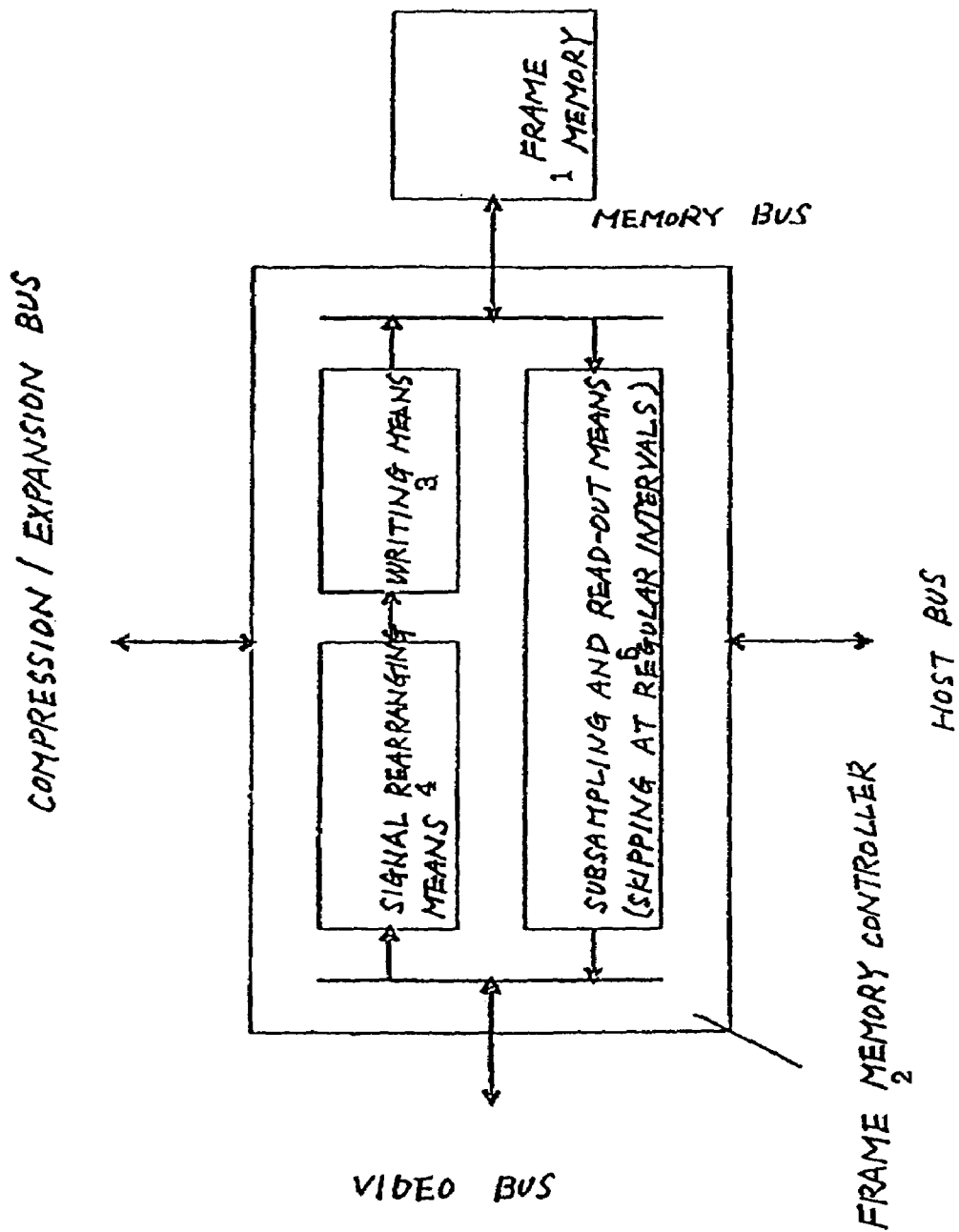
FIG. 1 is a block diagram of a frame memory device of a first embodiment.

In a frame memory device in accordance with a first embodiment, raster-scanned digital color image signals that are sequentially received from a video bus are rearranged in order, and then stored in the memory. Thus, the received signals are stored in the memory at different addresses than those of the conventional frame memory. If the order of the rearrangement is changed, storage addresses will be accordingly changed. In addition, when the image signals stored in the memory are subsampled and read out, so as to be generated from the video bus as raster-scanned signals, the order of rearrangement is changed according to the subsampling rate and the format of the image signals. The signals that are selectively read out by subsampling are stored at equally spaced horizontal and vertical addresses in the memory. In this manner, desirably selected signals are generated by subsampling and read-out means that read out signals while skipping horizontal and vertical addresses of the memory at regular intervals.

In a second, more specific embodiment, a conventional frame memory adapted to input and output $YC_BC_R$ 4:2:2 raster-scanned image signals, and store or read out the image signals indicative of one frame into or from the memory is provided with signal rearranging means and subsampling and read-out means, and $C_B$ and $C_R$ signals that are rearranged by the signal rearranging means in the order of $C_B \rightarrow C_B \rightarrow C_R \rightarrow C_R$ to be alternated at every other pixel, are synchronized with the Y signals, and these Y, C signals are written into the memory in parallel with each other. Thus, unlike the conventional frame memory device, the $C_B$ and $C_R$ signals are stored in the C memory in the order of $C_R \rightarrow C_B \rightarrow C_R \rightarrow C_R$ to be alternated at every other pixel, in the direction from lower horizontal addresses toward upper horizontal addresses. On the other hand, the Y signals are not rearranged, and are therefore stored in the order of entry from lower horizontal addresses toward upper horizontal addresses as in the conventional case. Further, with the Y and C signals being synchronized with each other, the horizontal storage addresses of the Y signals and C signals start at the same points. Moreover, the subsampling and read-out means is provided for reading out the Y and C signals in parallel with each other while accessing alternate ones of the horizontal and vertical addresses of the memory in which the image signals are stored. Therefore, the signals read out by this means are the same as signals obtained by subsampling the original image stored in the memory, exactly to one half in both the horizontal and vertical directions. Since the $C_B$ and $C_R$ signals are read out from the C memory in the order of $C_B \rightarrow C_R$, these signals are also generated from the video bus in the order of $C_B \rightarrow C_R$. In addition, the horizontal storage addresses of the Y signals and C signals start at the same point, whereby the Y signals and C signals are generated in the same phase from the video bus. Consequently, the format of the input signals coincides with that of the output signals except that the number of pixels is reduced by one half in both the horizontal and vertical directions.

In a third embodiment, the order of input/output of $C_B$ and $C_R$ signals on the C bus and the order of rearrangement of the $C_B$ and $C_R$ signals are exactly reversed with respect to those of the frame memory device of the second embodiment, thereby to input and output $YC_BC_R$ signals in which the C signals are multiplexed on the C bus in the order of $C_R \rightarrow C_B$.

According to the invention of a fourth embodiment, the frame memory devices of the second and third embodiments, are adapted such that the horizontal scan frequency and vertical scan frequency of image signals generated in the raster scan scheme are made equal to those of NTSC or PAL television signals. This arrangement is convenient where NTSC or PAL television signals are to be generated.

According to the invention of a fifth embodiment, horizontal and vertical addresses of a memory, such as a frame memory device, for storing image signals are respectively divided into a plurality of blocks each having a certain number (2m) of successive addresses as a unit. Then the image signals in each block are subsampled by skipping addresses at predetermined intervals as precisely as possible, so that image signals corresponding to (2n) addresses are read out from the block.

Figure 9:
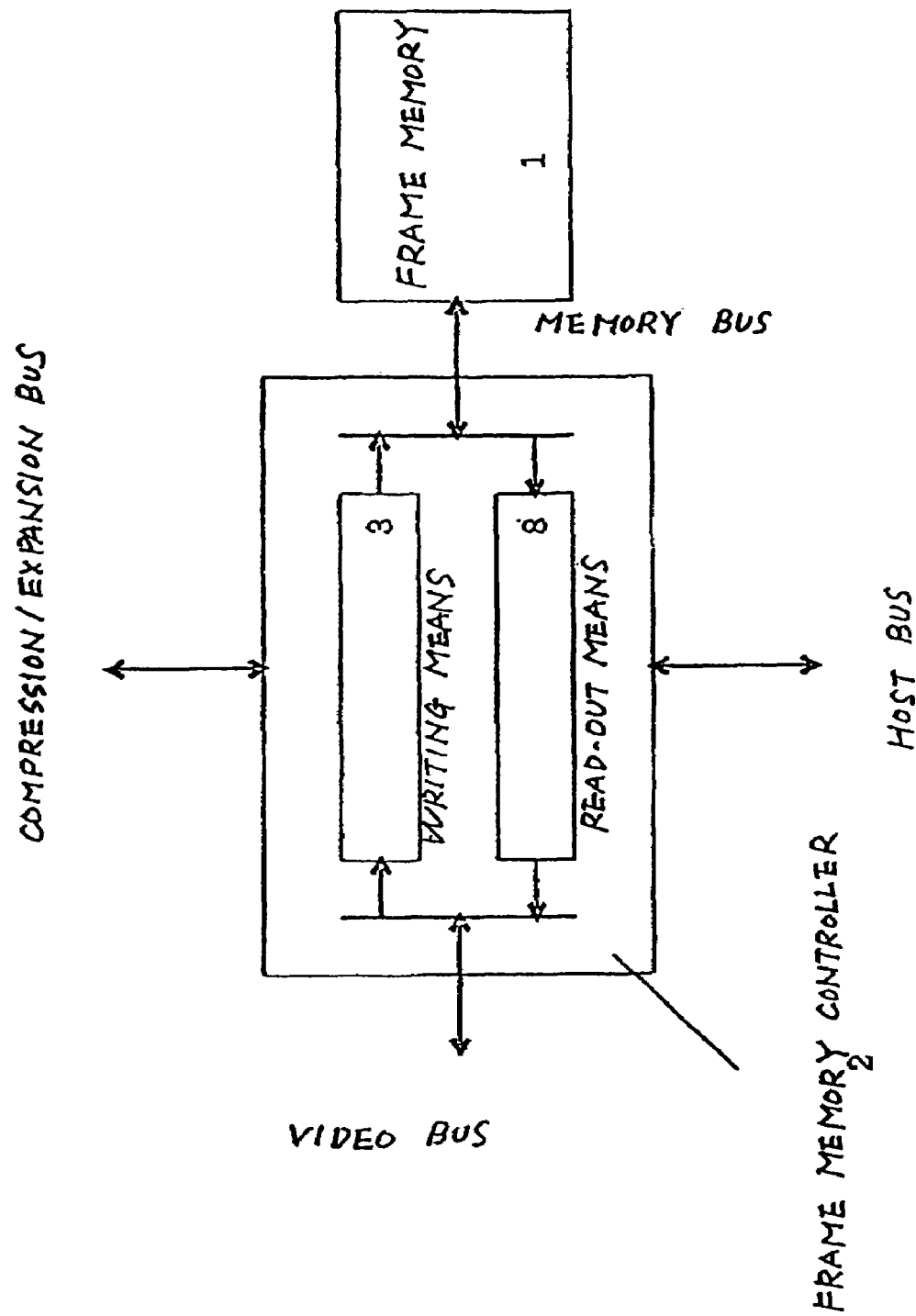
FIG. 9 is a block diagram of a conventional frame memory device.

FIG. 1 is a block diagram of a frame memory device according to the first embodiment of the present invention. The same reference numerals as used in the conventional frame memory device shown in FIG. 9 are used for identifying corresponding constituent elements. In FIG. 1, the frame memory controller 2 is incorporated in the control circuit 9, as in FIG. 9.

Raster-scanned image signals, which are sequentially received from a video bus (VBUS), are rearranged by a signal rearranging means 4 in an order different from the order of entry. One example of this signal rearranging means 4 is shown in FIG. 19.

Figure 19:
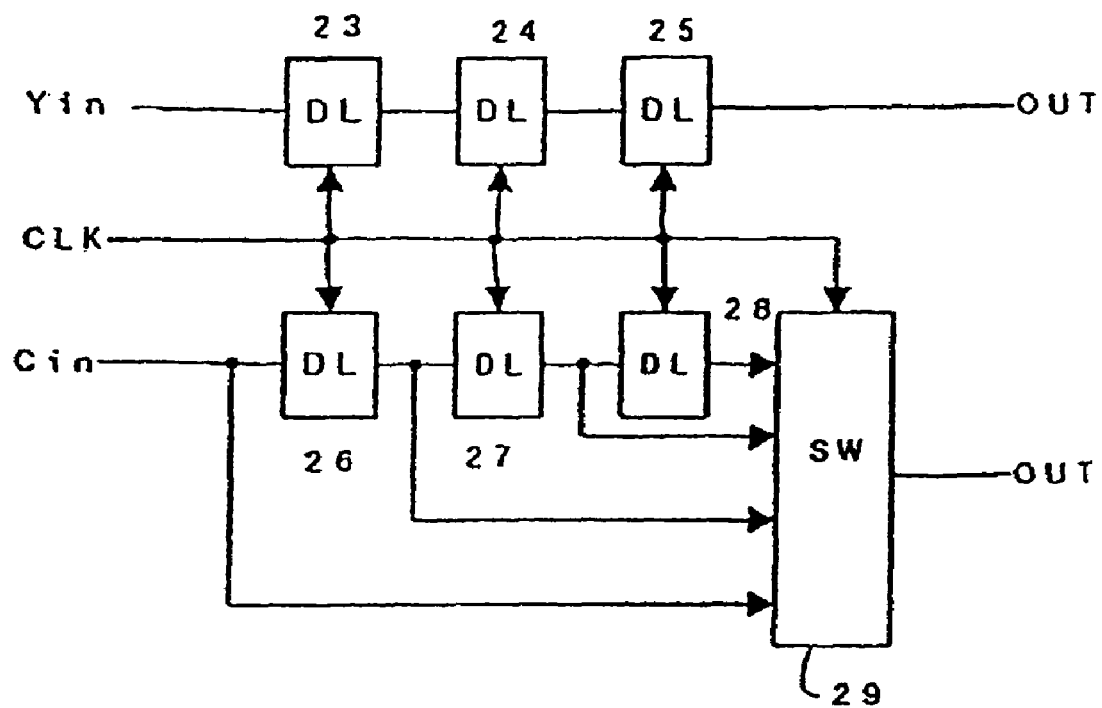
FIG. 19 is a block diagram of a signal rearranging means.

As shown in FIG. 19, the signal rearranging means 4 includes delay circuits 26, 27, 28 for C signals, delay circuits 23, 24, 25 for Y signals, and a selection switch 29, each of which receives clock signals CLK. Output signals of the respective delay circuits 26, 27, 28 are input in parallel to the selection switch 29. The order of the received C signals is then changed by the selection switch 29, and the rearranged signals are generated in a certain order.

On the other hand, Y signals are delayed by the delay circuits 23, 24, 25 by respective delay amounts corresponding to those of the delay circuits 26, 27, 28 for C signals, and are generated as they are in the order of entry.

As is apparent by comparing FIG. 1 with FIG. 9, the frame memory device of the first embodiment is different from the conventional frame memory device in that the present device has signal rearranging means 4 and subsampling and read-out means 5. The conventional frame memory device does not have subsampling and read-out means in which data are read out while addresses are skipped at regular or equal intervals.

Figure 10:
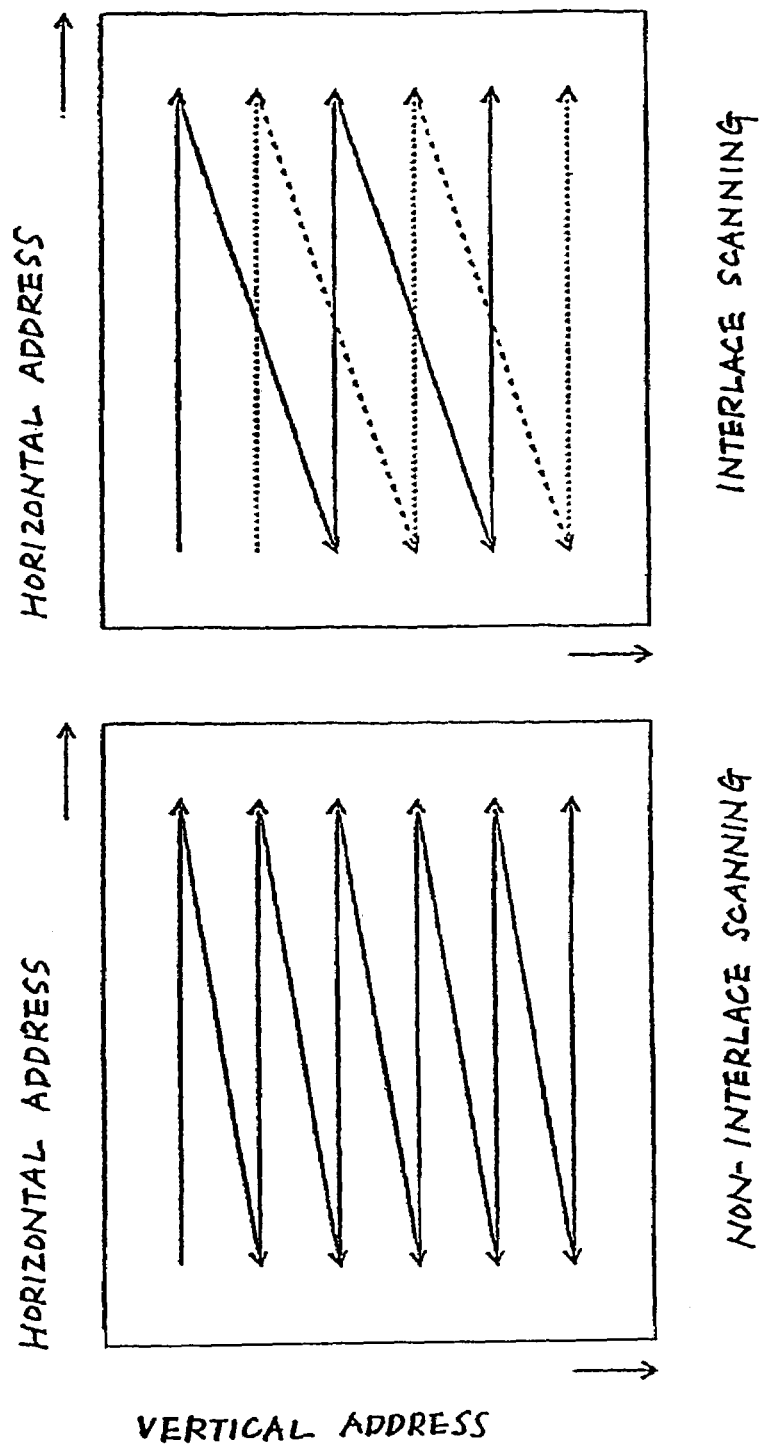
FIG. 10 is a view showing how video-input image signals are stored in the conventional frame memory.
Figure 12:
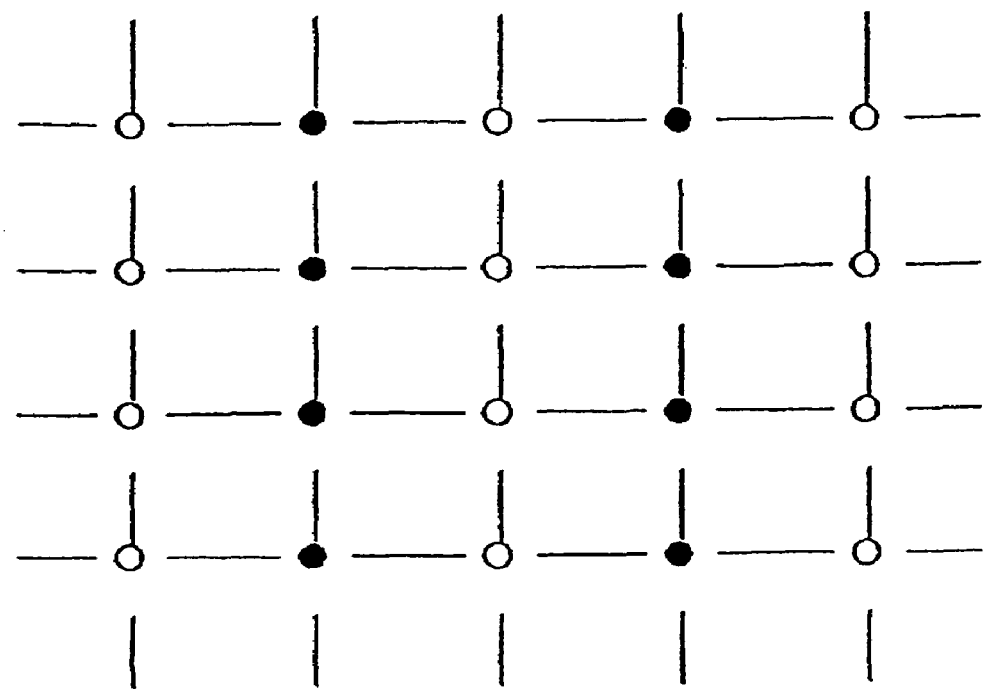
FIG. 12 is a view showing sampling coordinates of $YC_BC_R$ 4:2:2 image signals.
Figure 13:
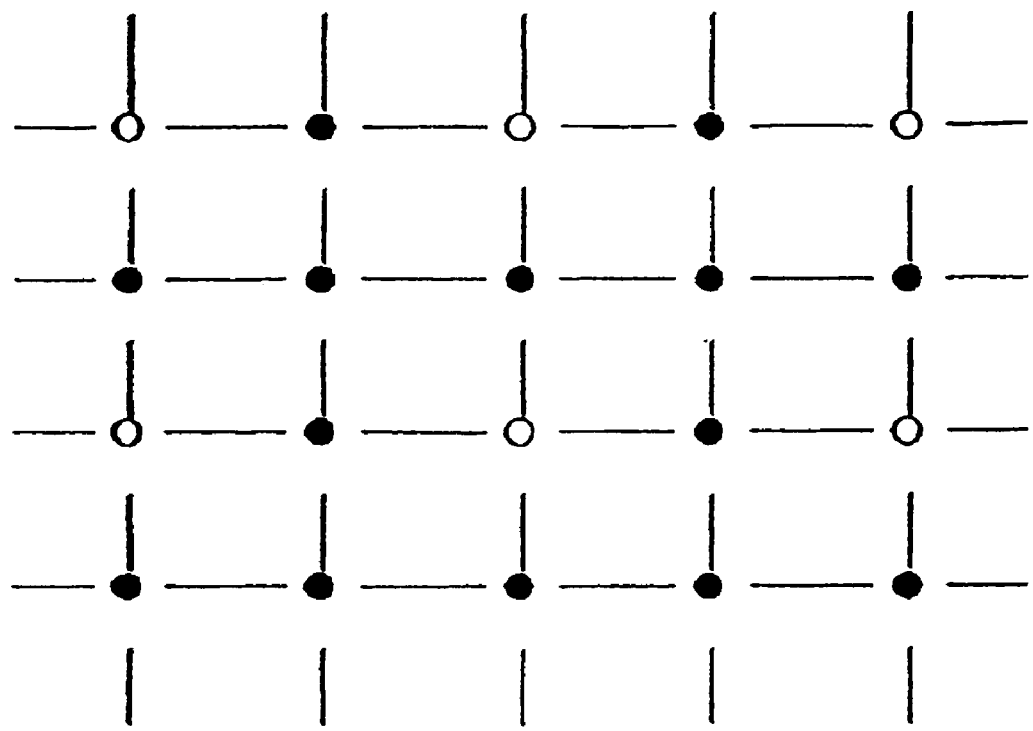
FIG. 13 is a view showing sampling coordinates of $YC_BC_R$ 4:1:1 image signals.

Referring to FIG. 1, the operation of the present frame memory device will be briefly described. Raster-scanned image signals, which are sequentially received from a video bus, are initially converted or rearranged by signal rearranging means 4 in an order different from the order of entry. The thus rearranged signals are sequentially written into the frame memory 1 by writing means 3 as in the conventional frame memory device. The signal writing means 3 writes the signals into respective addresses of the frame memory 1 in the order indicated in FIG. 10, so that the rearranged signals are stored in different addresses than those of the conventional device. If this rearrangement is limited to signals belonging to the same scan line, only horizontal addresses of the frame memory 1 reflect the result of the rearrangement. Where the rearrangement is conducted with respect to signals that extend over a plurality of scan lines, a line memory is needed, resulting in increases in the circuit scale and cost, so that all of the advantages of the rearrangement cannot be achieved. In the following description, therefore, the latter case will not be considered.

During video output, the subsampling and read-out means 5 reads out signals while skipping horizontal and vertical addresses of the frame memory 1 at regular intervals, respectively, so as to output the subsampled image signals. In order to output the signals in a raster scanning scheme, the subsampling and read-out means 5 reads out the signals while skipping the horizontal and vertical addresses at regular intervals in the order of arrows shown internally of the rectangles in FIG. 10. The number or amount of addresses skipped in this operation is determined by the rates of subsampling. Since the horizontal subsampling rate is usually made equal to the vertical subsampling rate so as to retain the same aspect ratio of an image, the number of addresses skipped in the horizontal direction is the same as that of addresses skipped in the vertical direction. In the case of data read out by interlace scanning, the vertical addresses are skipped at doubled intervals compared to the above-indicated intervals, so that data in the odd-numbered field (the first field) are initially read out, and data in the even-numbered field (the second field) are then read out. Scan lines of the odd-numbered field are located between scan lines of the even-numbered field, and scan lines of the even-numbered field are located between scan lines of the odd-numbered field, which means that vertical addresses are skipped at intervals determined by the subsampling rate, considering a frame in which both of the fields are combined together.

Figure 2:
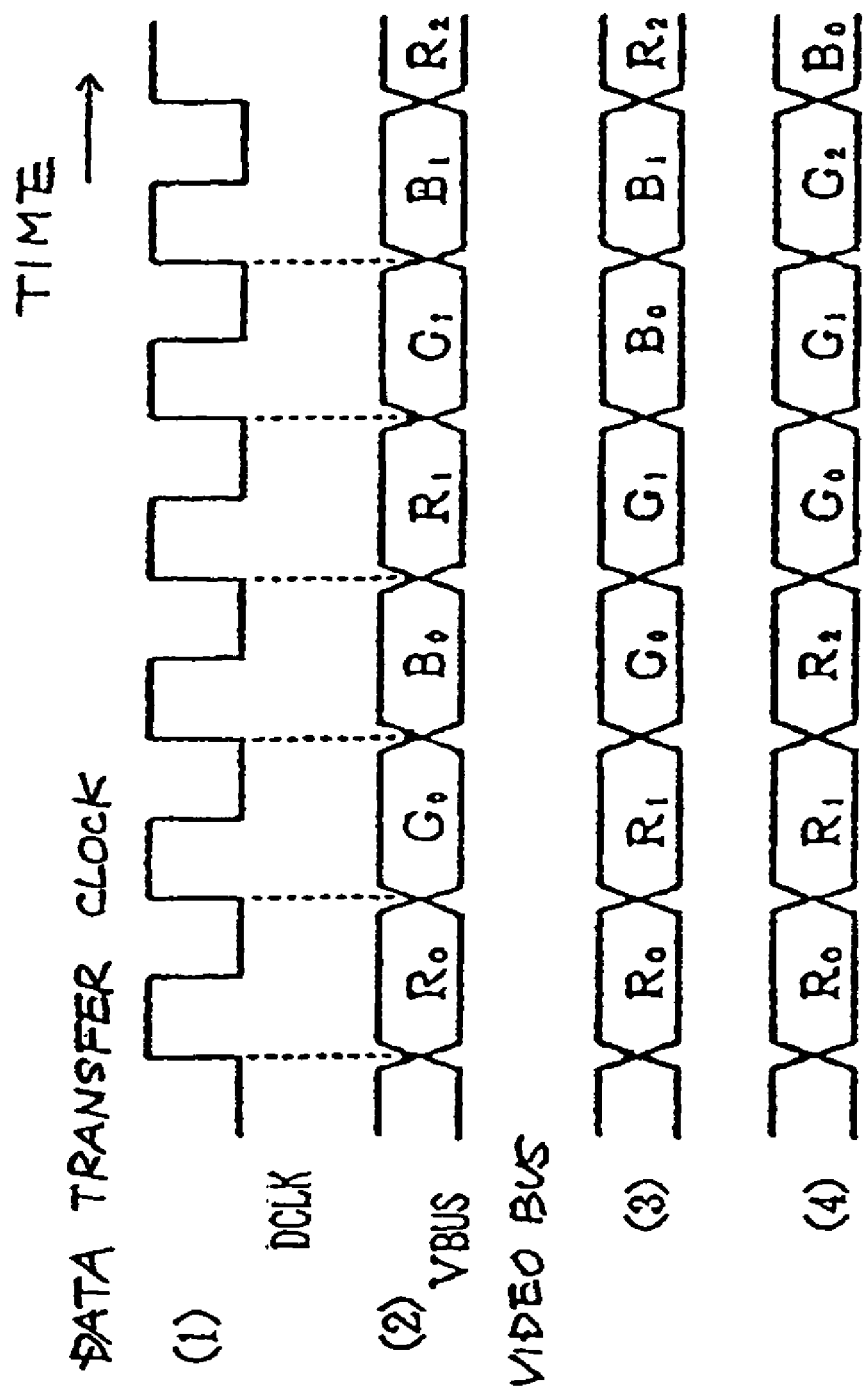
FIG. 2 is a view showing one example of signals input and output, through a video bus in the frame memory of the first embodiment.
Figure 3:
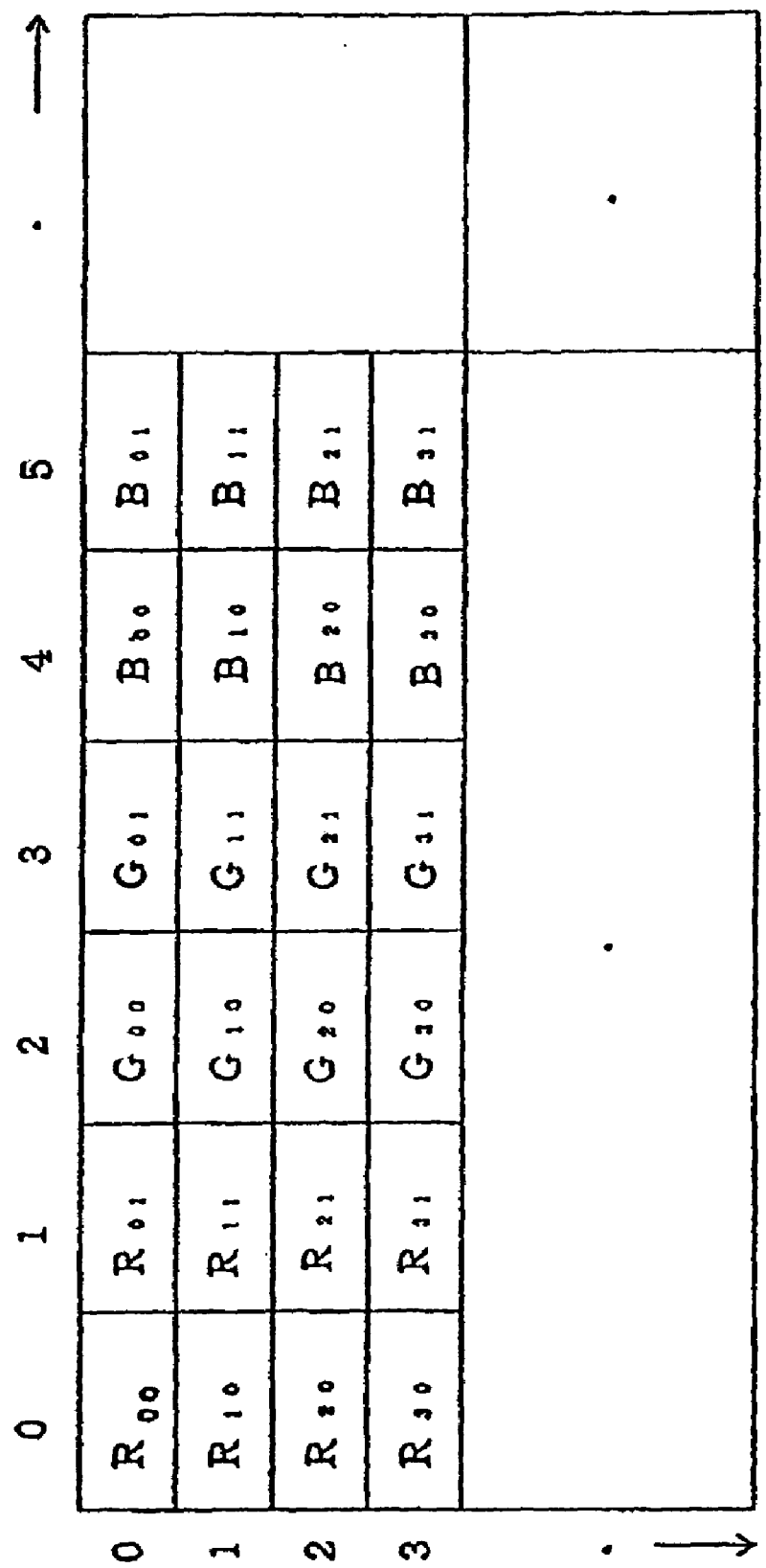
FIG. 3 is a view showing how respective signals are stored in a memory when the frame memory device of the first embodiment receives image signals shown in FIG. 2.

Which signals are read out by skipping horizontal addresses at regular intervals depends upon the order of the signals that have been rearranged by the selection switch 29 (FIG. 19) in the signal rearranging means 4. By appropriately selecting the order of this rearrangement, the signals that are read out while skipping addresses at regular intervals as described above can be exactly brought in line with the signals that are removed by subsampling. Generally, the order of this rearrangement must be varied depending upon the format of the image signal entered from the video bus and the subsampling rate. For example, where a color image signal consisting of R, G, B color signal components each of which has the same number of pixels is received from a single video bus in the order of R→G→B such that these color components are multiplexed, as shown in line (2) of FIG. 2, and the signal that has been subsampled to one half is again output from the video bus, the input signals are rearranged for storage in the memory in the order of R→R→G→G→B→B such that the color component changes at alternate pixels, as shown in line (3) of FIG. 2, so that these signals are stored in the addresses as shown in FIG. 3. If the color components in every other address are read out, a signal in which the color components are multiplexed in the order of R→G→B is generated from the video bus. If the signal is to be subsampled to one third, it may be rearranged such that the color component changes at every third pixel, as shown in line (4) of FIG. 2. Since the number of horizontal pixels of each color signal component varies depending upon the image signal, the order of rearrangement must be changed for different signal formats. Thus, the order of signal rearrangement needs to be changed depending upon the signal format and subsampling rate, so as to output a correctly subsampled signal when the signal is read out with addresses of the memory skipped at regular intervals. Line (1) in FIG. 2 shows the data transfer clock signals.

Figure 4:
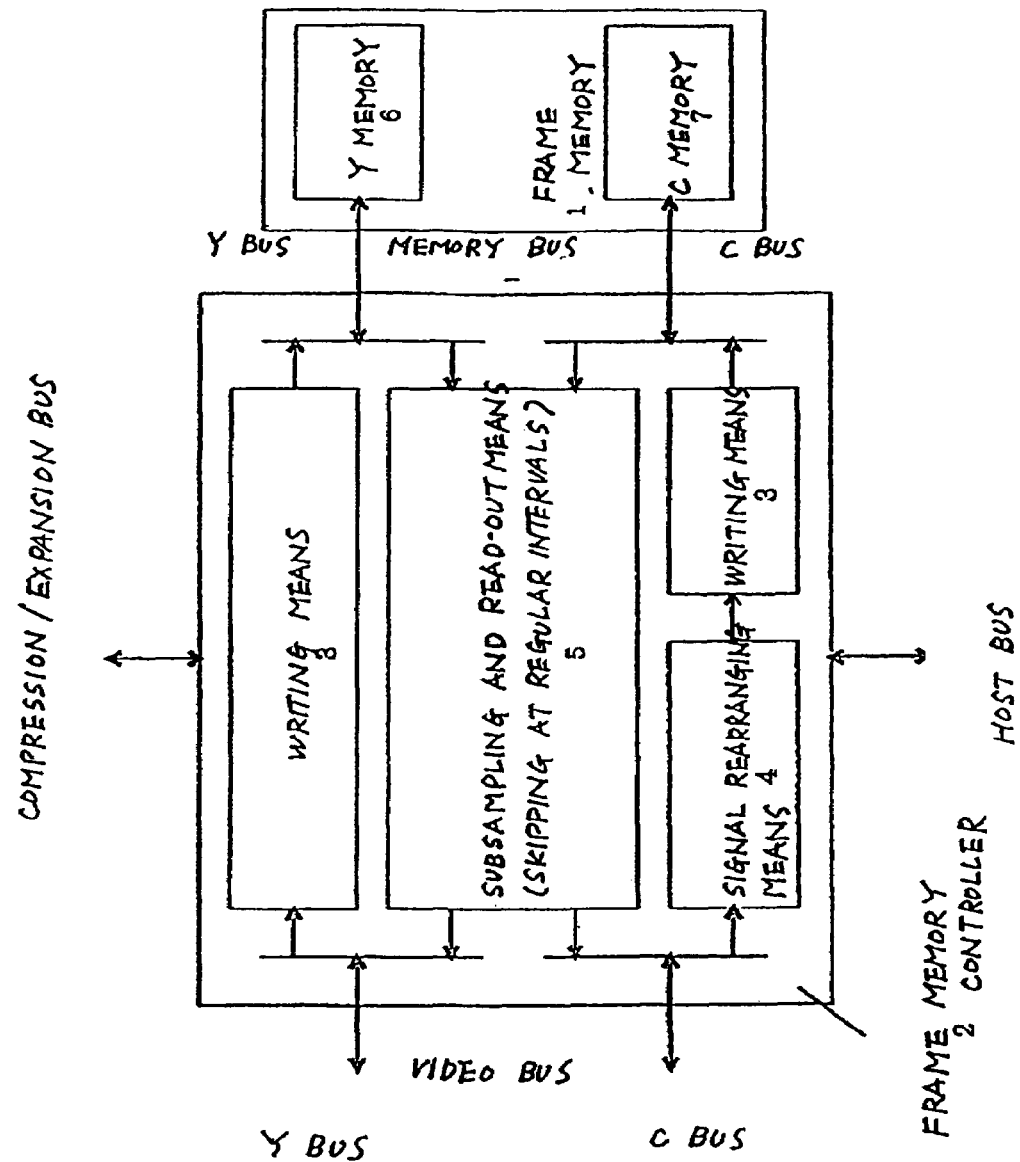
FIG. 4 is a block diagram of a frame memory device of a second embodiment.

FIG. 4 is a block diagram showing a frame memory device according to the second embodiment of the present invention. The frame memory device of the second embodiment is a combination of a conventional frame memory device which stores and reads out a $YC_BC_R$ 4:2:2 image signal, and the frame memory device of the first embodiment.

Figure 14:
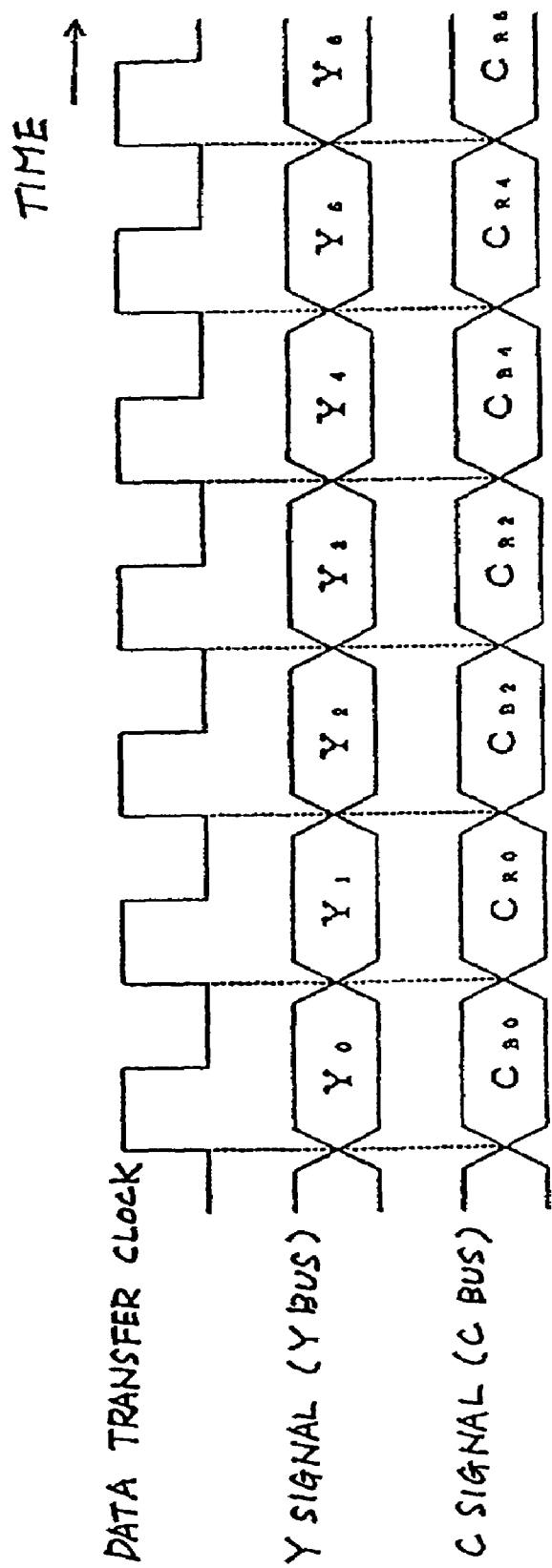
FIG. 14 is a view showing the manner of input and output of $YC_BC_R$ 4:2:2 image signals from a video bus.
Figure 15:
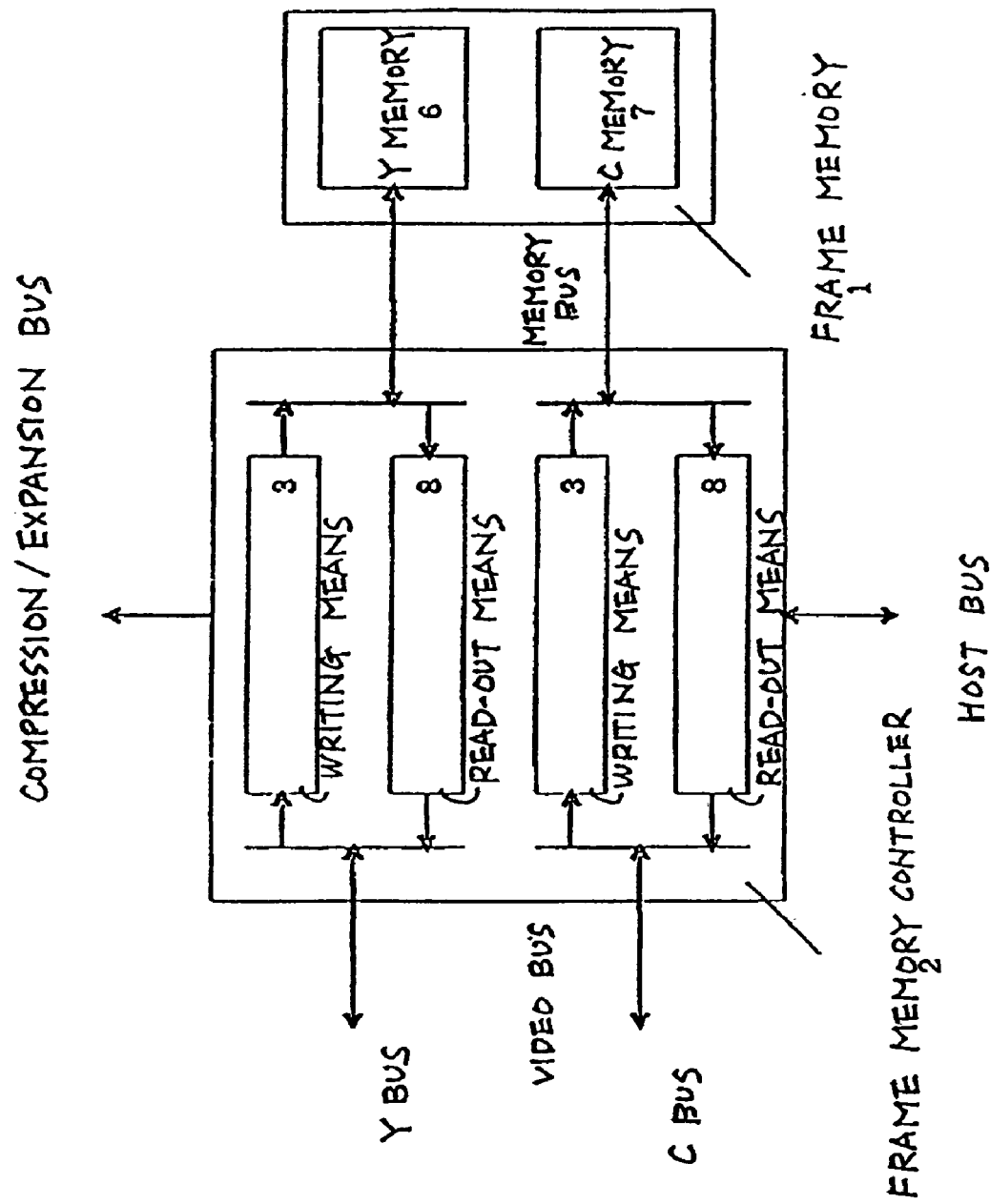
FIG. 15 is a block diagram of a conventional frame memory device for storing and reading out $YC_BC_R$ 4:2:2 image signals.

In the conventional frame memory device that stores and reads out a $YC_BC_R$ 4:2:2 image signal, a video bus generally consists of Y bus and C bus as shown in FIG. 15. This device is characterized in that $C_B$ and $C_R$ signals that are input and output from C bus are multiplexed in the order of $C_B$→$C_R$ as shown in FIG. 14.

Figure 16A:
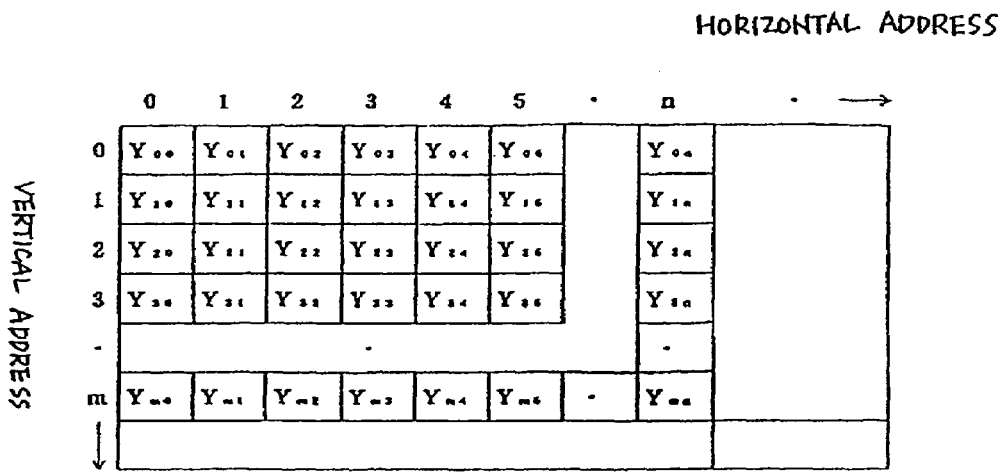
FIG. 16 is a view showing addresses in which respective signals are stored when the conventional frame memory device stores $YC_BC_R$ 4:2:2 image signals.
Figure 16B:
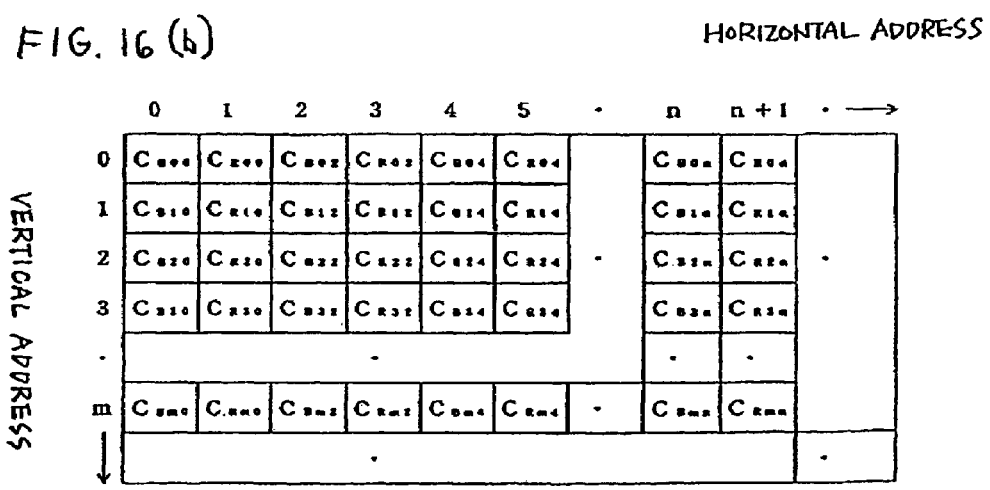
Figure 17:
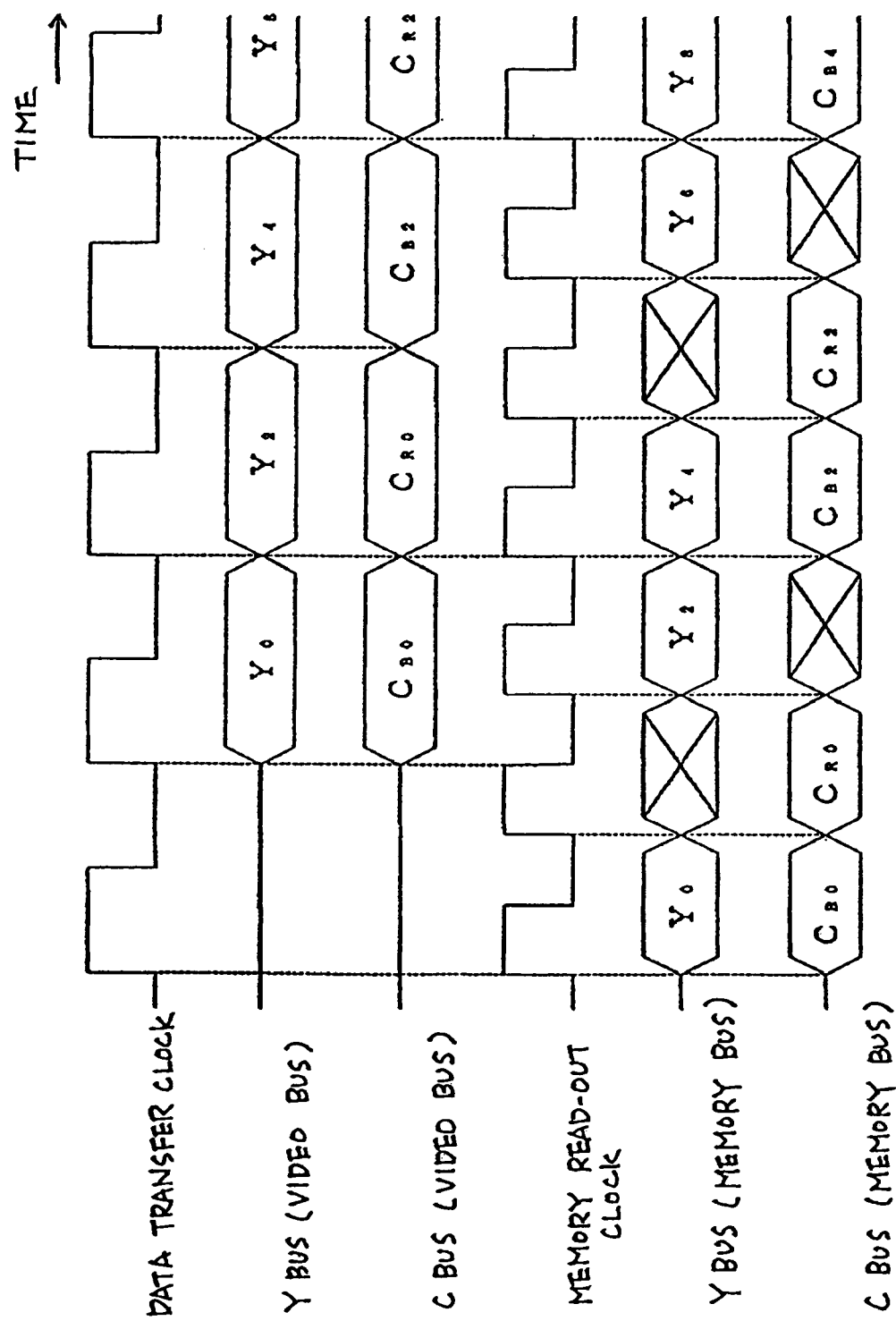
FIG. 17 is a view showing a first example in which $YC_BC_R$ 4:2:2 image signals stored in the conventional frame memory device are subsampled to one half in both horizontal and vertical directions.
Figure 18:
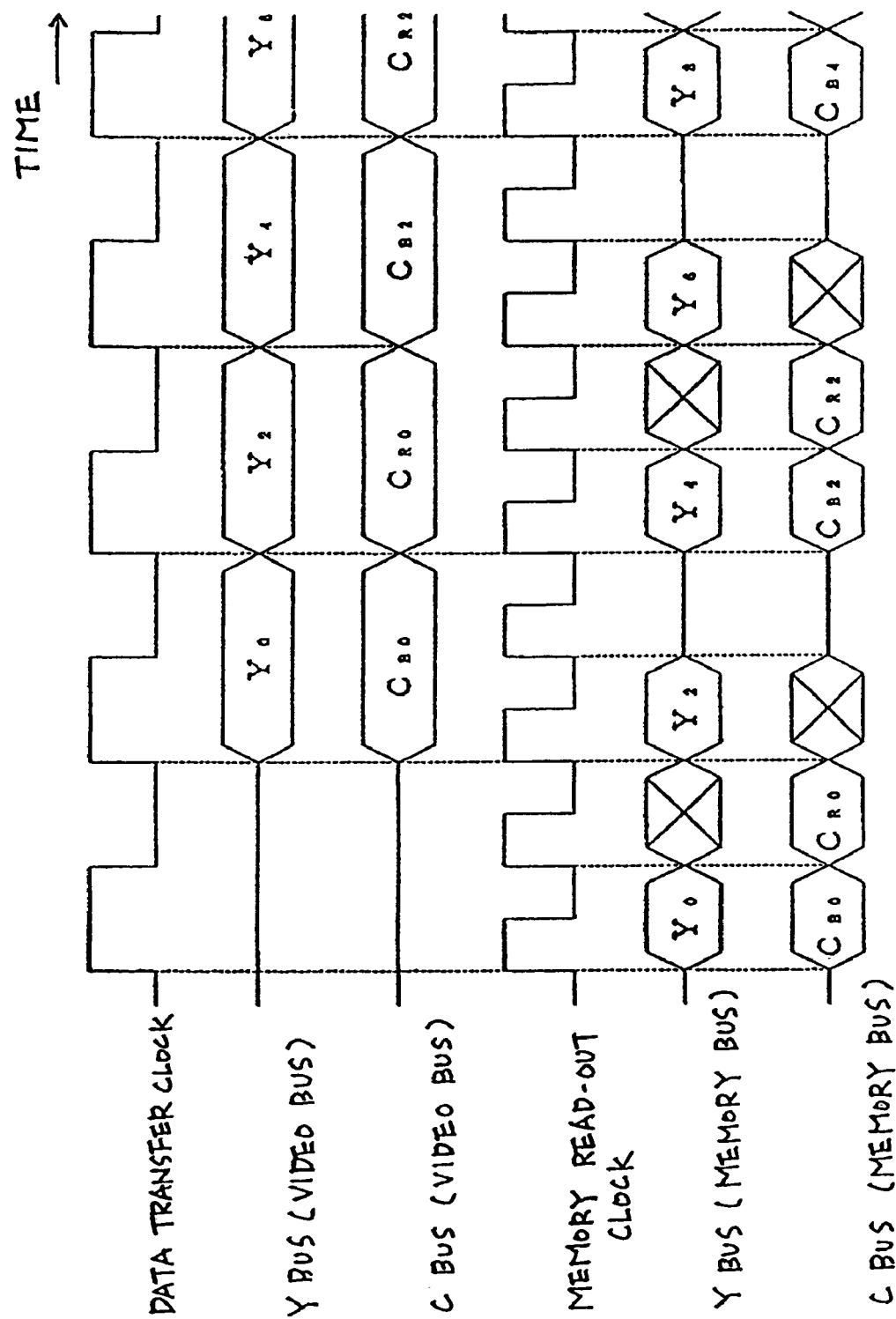
FIG. 18 is a view showing a second example in which $YC_BC_R$ 4:2:2 image signals stored in the conventional frame memory device are subsampled to one half in both horizontal and vertical directions.

In the conventional frame memory device, therefore, the signals are stored in the addresses as shown in FIG. 16. In the frame memory device of the present invention (FIG. 4), C bus is provided with signal rearranging means 4 for changing the order of $C_B$ and $C_R$ signals, whereby horizontal storage addresses of these signals are different from those of the conventional frame memory device. The $C_B$ and $C_R$ signals are thus rearranged by this signal rearranging means 4 in the order of $C_B$→$C_B$→$C_R$→$C_R$, and then transmitted to writing means 3. On the other hand, Y signals are transmitted to the writing means 3 in the same order of input of these signals.

Signals that have passed the signal rearranging means 4 are not only changed in the order but also delayed with respect to normally input signals. Since Y and C signals are entered in the same phase from the video bus, C signals that have passed the signal rearranging means 4 and Y signals are already out of phase. In view of this, a delay circuit 23, 24, 25 is provided for Y signals so as to synchronize the Y signals with the C signals. This delay circuit 23, 24, 25 is shown in FIG. 19, and it is incorporated in the writing means 3. If the thus synchronized signals are written into the frame memory 1, the order of rearranged C signals is reflected by horizontal addresses of the memory, and these signals are stored in the addresses as shown in FIG. 5. The Y signals that are merely delayed are stored in the same addresses as shown in FIG. 16(a).

If Y signals and C signals are read out in parallel with each other by skipping every other horizontal address and every other vertical address, C signals are multiplexed at alternate pixels and output in the order of $C_B \rightarrow C_R$, and these output signals are identical with signals obtained by subsampling the original image exactly to one half. Y signals are also generated as signals that have been subsampled to one half. It is important that the Y signals and C signals that are subsampled and read out are stored in the same or coincident horizontal addresses. The vertical storage addresses of the Y signals automatically coincide with those of the C signals since these Y and C signals are simultaneously entered as signals for one scan line. It will be understood from the fact that the Y signals and C signals that are subsampled and output have the same addresses, that the address signals for Y memory 6 and C memory 7 may be derived from a common source.

The image signal stored as shown in FIGS. 5 (for C) and 16(a) (for Y) is a result of synchronizing the rearranged $C_B$ and $C_R$ signals with appropriately delayed Y signals, and writing these Y and C signals into the memory in parallel with each other. The address signals generated at this time are common to the Y memory 6 and C memory 7. Thus, if the $C_B$ and $C_R$ signals are rearranged in the order of $C_B \rightarrow C_B \rightarrow C_R \rightarrow C_R$ and written into the memory after being synchronized with the Y signals, common address signals can be given to the Y memory 6 and C memory 7 for video input and output.

While the above arrangement is convenient for video input and output, it is appropriate to consider whether this arrangement causes any problem during image compression and expansion. If the image compression and expansion are performed in a mode such as JPEG in which color signals are separately processed, no problem is caused by rearranging image signals and then storing them in the memory. Since means for reading out and writing the signals in the JPEG compression/expansion mode does not require Y signals and C signals to be received from and generated to the respective memories in parallel with each other, these memories may be provided with addresses corresponding to respective color signals, so as to enable the signals to be read out from and written into the memories. For example, as the addresses of the Y signals are identical with those of the conventional device, the input and output of Y signals may be effected upon compression/expansion with the Y memory 6 provided with the same addresses as used in the conventional device.

On the other hand, $C_B$ and $C_R$ signals are stored in different addresses than those of the conventional device. During compression/expansion, therefore, address signals that correspond to storage addresses of respective $C_B$ and $C_R$ signals are given to the C memory 7, to enable the input/output of the signals. To this end, the present device must be provided with an address generator for reading out and writing signals upon compression and expansion, which is different from a known counterpart.

As described above, if $YC_BC_R$ 4:2:2 image signals are processed such that $C_B$ and $C_R$ signals are rearranged in the order of $C_B \rightarrow C_B \rightarrow C_R \rightarrow C_R$, and Y signals are suitably delayed in accordance with the C signals, so that the Y and C signals are simultaneously stored in the memory, the signals stored in the memory can be easily subsampled to one half and generated as raster-scanned signals.

Further, the address signals of the Y memory 6 and C memory 7 can be derived from a common source, resulting in fewer signal lines and a reduced size of the device. In the case of JPEG compression and expansion, an address generator that is different from the known counterpart may be provided for enabling read-out/writing of $C_B$ and $C_R$ signals in accordance with storage addresses of the respective signals. This facilitates input and output of block image signals each consisting of 8 horizontal×8 vertical as required in the JPEG mode.

Figure 6:
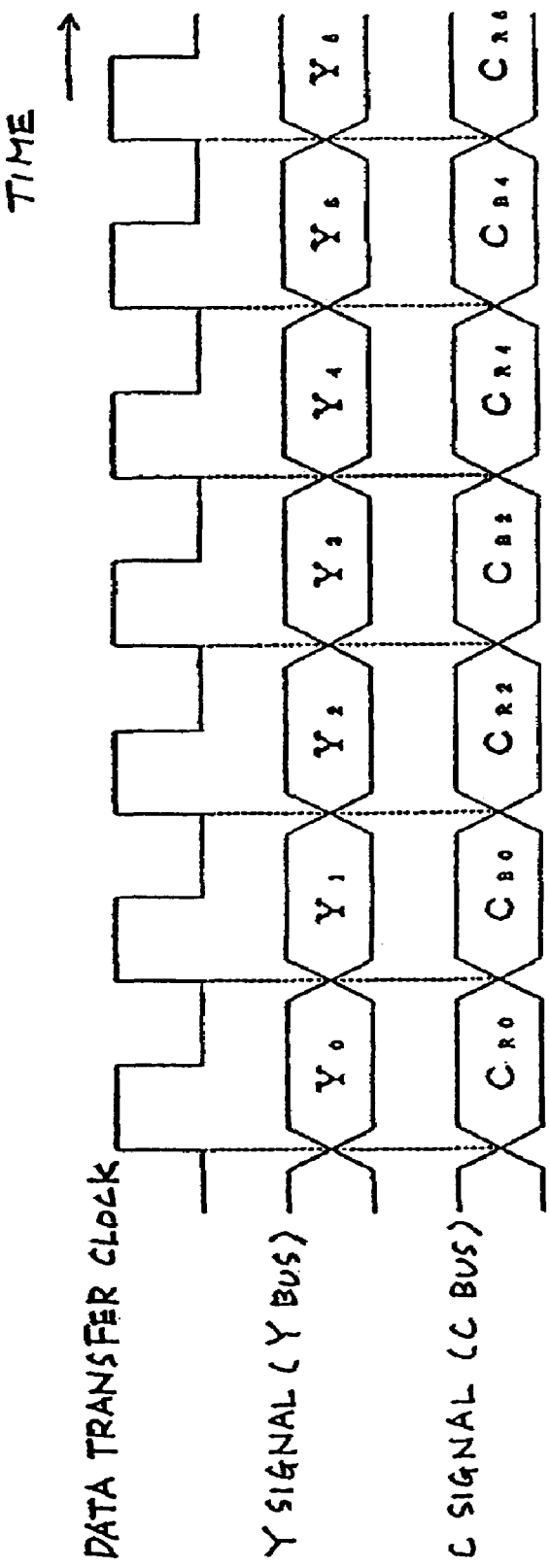
FIG. 6 is a view showing the manner of input and output of signals from a video bus in a frame memory of a third embodiment.
Figure 8:
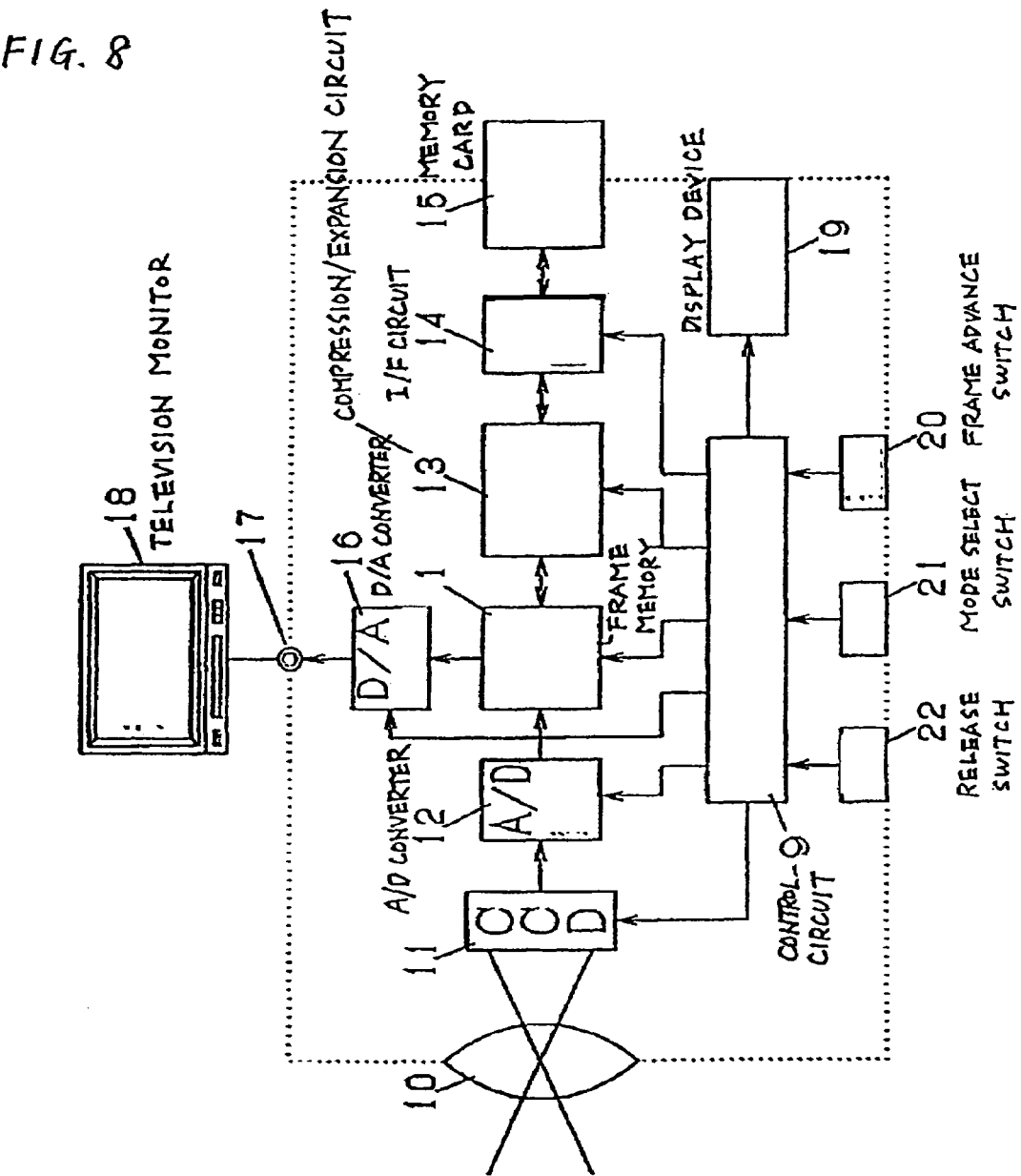
FIG. 8 is a view showing an example of a digital still camera.

FIG. 6 shows the manner of input/output of signals from the video bus in a frame memory device according to a third embodiment of the present invention. In this frame memory device, the order of input/output of $C_B$ and $C_R$ signals on C bus in the frame memory device as defined in the second embodiment is exactly reversed, i.e., changed into the order of $C_R \rightarrow C_B$. The present frame memory device uses the same hardware as that of the second embodiment, but is merely adapted to input and output signals from C bus in the order of $C_R \rightarrow C_B$. Since $C_B$ and $C_R$ signals are entered in the order of $C_R \rightarrow C_B$, the C signals are rearranged in the order of $C_R \rightarrow C_R \rightarrow C_B \rightarrow C_B$, which is exactly opposite to the order employed in the second embodiment. With the C signals thus rearranged, storage addresses of signals on the C memory 7 are also exactly reversed with respect to those of the second embodiment, as is understood from FIG. 7. Thus, the hardware of the frame memory device of the second embodiment can be advantageously used in the third embodiment, with a mere change in the input/output order of the $C_B$ signals and $C_R$ signals.

Image signals stored in the memory and subsampled and read out are generated as raster-scanned signals to produce a lower resolution image than the original image in the frame memory devices of the first through third embodiments, but the horizontal scan frequency and vertical scan frequency during the output of the image signals are not specified. In the frame memory devices as defined in the second and third embodiments, in particular, the horizontal scan frequency and vertical scan frequency at the time of subsampling $YC_BC_R$ 4:2:2 image signals and outputting the signals in the raster scanning scheme are made equal to the horizontal scan frequency and vertical scan frequency of NTSC or PAL television signals, to provide a frame memory device as defined in the fourth embodiment. With the horizontal scan frequency and vertical scan frequency of the $YC_BC_R$ 4:2:2 image signals output from this frame memory device being equal to those of NTSC or PAL television signals, it is possible to easily produce and output NTSC or PAL television signals by signal processing circuit in a later step. This makes it easy to display the reproduced image on an NTSC or PAL television monitor.

A fifth embodiment of the present invention will now be explained. In this embodiment, horizontal and vertical addresses of a memory, such as a frame memory device, for storing image signals are respectively divided into a plurality of blocks each having a certain number (2m) of successive addresses as a unit. Then, the image signals in each block are subsampled by skipping addresses at predetermined intervals as precisely as possible, so that image signals corresponding to (2n) addresses are read out from the block.

More particularly, Y signals are stored in Y memory 6, without being rearranged, in the order in which these signals are entered from the Y bus. In regard to C signals entered via the C bus, on the other hand, 2n pieces of data (n pieces of $C_B$ signals and n pieces of $C_R$ signals) to be read out are stored in C memory 7 at 2n addresses in each block consisting of 2m addresses, in the increasing order from lower-order to high-order addresses.

Accordingly, the image signals are subsampled at the rate of 2n/2m and then read out. In this connection, "m" and "n" are integers which are prime to each other (no common factor that is larger than 1 exists).

While the image signals, when subsampled, are read out at regular intervals in the previous embodiments as described above, this may be considered as a special case of this embodiment where one address is assigned to an image signal picked up from each address block.

Some examples of the present embodiment will next be described.

In the first example, "m" is equal to 5, and "n" is equal to 3.

Suppose an image having 768×576 pixels is reproduced from an original image having 1280×1024 pixels. In this case, successive 960 lines are suitably selected in advance from 1024 lines arranged in the vertical direction, and data in the selected lines are subsampled or reduced to ⅗ so that the image of 768×576 pixels is finally obtained. This example is equivalent to the case where the above-indicated original image is reproduced as PAL television signals.

If the above-described manner of simply subsampling data to one half as in the previous embodiments is applied to PAL television, the resulting image displayed on a television monitor is smaller than the effective screen size. In the present embodiment, however, the original image can be displayed over substantially the entire area of the effective screen of PAL television. Also, reproduction clock signals may be generated at 14.75 MHz selected for PAL square pixels.

In the present embodiment, C signals need to be rearranged in an order that depends upon the manner in which the image signals stored in the memory are subsampled when they are read out. The selection switch 29 of the signal rearranging circuit 4 as shown in FIG. 19 is suitably constructed so as to make this rearrangement possible. In the first example, in particular, C signals are rearranged in the order as indicated below, and these signals are stored at horizontal addresses of the C memory 7 in the same order.

Data representation showing the order of C signals below does not include vertical-direction addresses since data consisting of these C signals are not associated with particular vertical addresses. This applies to other examples as described later.

$C_{B0}$, $C_{R0}$, $C_{B2}$, $C_{R2}$, $C_{B4}$, $C_{R4}$, $C_{B6}$, $C_{R6}$, $C_{B8}$, $C_{R8}$, . . .

→$\underline{C_{B0}}$, $C_{B2}$, $\underline{C_{R0}}$, $C_{R2}$, $\underline{C_{B4}}$, $\underline{C_{R4}}$, $C_{B6}$, $\underline{C_{B8}}$, $C_{R6}$, $\underline{C_{R8}}$, . . .

In the above data representation, the left side of the arrow shows the order in which the image signals are input to the signal rearranging circuit 4, and the right side of the arrow shows the order in which the image signals are rearranged and generated from the signal rearranging circuit 4. The image signals are stored in a memory in the latter order.

Further, underlined signals on the right-hand side of the arrow in the above representation are those which are picked up by subsampling and read out from the memory. This notation applies to the following examples.

In the second example, "m" is equal to 5, and "n" is equal to 2. This example represents the case where an image of 640×480 pixels is reproduced from an original image of 1600×1200 pixels. This example also corresponds to the case where the above-indicated original image is reproduced as NTSC television signals.

As a result of this example, the original image can be displayed over substantially the entire area of the effective screen of NTSC television. Also, reproduction clock signals may be generated at 12.2727 MHz selected for NTSC square pixels.

In this example, C signals are rearranged in the order as indicated below. When reading out data from the memory, 4 pixels are picked out of 10 pixels of C signals by subsampling, and generated. The meanings of the left side and right side of the arrow are as explained with respect to the first example. The C signals are stored at horizontal addresses of the C memory 7 in the same order as indicated below.

$C_{B0}$, $C_{R0}$, $C_{B2}$, $C_{R2}$, $C_{B4}$, $C_{R4}$, $C_{B6}$, $C_{R6}$, $C_{B8}$, $C_{R8}$, . . .

→$C_{B0}$, $\underline{C_{B2}}$, $C_{R0}$, $\underline{C_{R2}}$, $C_{B4}$, $C_{R4}$, $\underline{C_{B6}}$, $C_{B8}$, $\underline{C_{R6}}$, $C_{R8}$, . . .

In the third example, "m" is equal to 25, and "n" is set to 12. This example represents the case where an image of 768×576 pixels is reproduced from an original image of 1600×1200 pixels. This example also corresponds to the case where the above-indicated original image is reproduced as PAL television signals.

As a result of this example, the original image can be displayed over substantially the entire area of the effective screen of PAL television. Also, reproduction clock signals may be generated at 14.7500 MHz selected for PAL square pixels.

In this example, C signals are rearranged in the order as indicated below. When reading out data, 24 pixels are picked out of 50 pixels of C signals by subsampling, and generated. The meanings of the left side and right side of the arrow are as explained with respect to the first example. The C signals are stored at horizontal addresses of the C memory 7 in the same order as indicated below.

$C_{B00}$, $C_{R00}$, $C_{B02}$, $C_{R02}$, $C_{B04}$, $C_{R04}$, $C_{B06}$, $C_{R06}$, $C_{B08}$, $C_{R08}$, $C_{B10}$, $C_{R10}$, $C_{B12}$, $C_{R12}$, $C_{B14}$, $C_{R14}$, $C_{B16}$, $C_{R16}$, $C_{B18}$, $C_{R18}$, $C_{B20}$, $C_{R20}$, $C_{B22}$, $C_{R22}$, $C_{B24}$, $C_{R24}$, $C_{B26}$, $C_{R26}$, $C_{B28}$, $C_{R28}$, $C_{B30}$, $C_{R30}$, $C_{B32}$, $C_{R32}$, $C_{B34}$, $C_{R34}$, $C_{B36}$, $C_{R36}$, $C_{B38}$, $C_{R38}$, $C_{B40}$, $C_{R40}$, $C_{B42}$, $C_{R42}$, $C_{B44}$, $C_{R44}$, $C_{B46}$, $C_{R46}$, $C_{B48}$, $C_{R48}$,

→$C_{B00}$, $\underline{C_{B02}}$, $C_{R00}$, $\underline{C_{R02}}$, $C_{B04}$, $\underline{C_{B06}}$, $C_{R04}$, $\underline{C_{R06}}$, $C_{B08}$, $\underline{C_{B10}}$, $C_{R08}$, $\underline{C_{R10}}$, $C_{B12}$, $\underline{C_{B14}}$, $C_{R12}$, $\underline{C_{R14}}$, $C_{B16}$, $\underline{C_{B18}}$, $C_{R16}$, $\underline{C_{R18}}$, $C_{B20}$, $\underline{C_{B22}}$, $C_{R20}$, $\underline{C_{R22}}$, $C_{B24}$, $\underline{C_{B26}}$, $C_{R24}$, $\underline{C_{R26}}$, $C_{B28}$, $\underline{C_{B30}}$, $C_{R28}$, $\underline{C_{R30}}$, $C_{B32}$, $\underline{C_{B34}}$, $C_{R32}$, $\underline{C_{R34}}$, $C_{B36}$, $\underline{C_{B38}}$, $C_{R36}$, $\underline{C_{R38}}$, $C_{B40}$, $\underline{C_{B42}}$, $C_{R40}$, $\underline{C_{R42}}$, $C_{B44}$, $\underline{C_{B46}}$, $C_{R44}$, $\underline{C_{R46}}$, $C_{B48}$, $\underline{C_{B50}}$, In the fourth example, "m" is equal to 8, and "n" is equal to 5. This example represents the case where an image of 640×480 pixels is reproduced from an original image of 1024×768 pixels. This example also corresponds to the case where the above-indicated original image is reproduced as NTSC television signals.

As a result of this example, the original image can be displayed over substantially the entire area of the effective screen of NTSC television. Also, reproduction clock signals may be generated at 12.2727 MHz selected for NTSC square pixels. In this example, C signals are rearranged in the order as indicated below. When reading out data from the memory, 10 pixels are picked out of 16 pixels of C signals by subsampling, and generated. The meanings of the left side and right side of the arrow are as explained with respect to the first example. The C signals are stored at horizontal addresses of the C memory 7 in the same order as indicated below.

$C_{B0}, C_{R0}, C_{B2}, C_{R2}, C_{B4}, C_{R4}, C_{B6}, C_{R6}, C_{B8}, C_{R8},$ $C_{B10}, C_{R10}, C_{B12}, C_{R12}, C_{B14}, C_{R14}, \ldots$ $\rightarrow \sout{C_{B0}}, C_{B2}, \sout{C_{R0}}, C_{R2}, \sout{C_{B4}}, C_{B6}, \sout{C_{R4}}, \sout{C_{B8}}, \sout{C_{R8}},$
$\sout{C_{B10}},$ $C_{R6}, \sout{C_{R10}}, C_{B12}, \sout{C_{B14}}, C_{R12}, \sout{C_{R14}}, \ldots$ In the fifth example, "m" is equal to 4, and "n" is equal to 3. This example represents the case where an image of 768×576 pixels is reproduced from an original image of 1024×768 pixels. This example also corresponds to the case where the above-indicated original image is reproduced as PAL television signals.

As a result of this example, the original image can be displayed over substantially the entire area of the effective screen of PAL television. Also, reproduction clock signals may be generated at 14.7500 MHz selected for PAL square pixels.

In this example, C signals are rearranged in the order as indicated below. When reading out data from the memory, 6 pixels are picked out of 8 pixels of C signals by subsampling, and generated. The meanings of the left side and right side of the arrow are as explained with respect to the first example. The C signals are stored at horizontal addresses of the C memory 7 in the same order as indicated below.

$C_{B0}, C_{R0}, C_{B2}, C_{R2}, C_{B4}, C_{R4}, C_{B6}, C_{R6}, \ldots$ $\rightarrow \sout{C_{B0}}, C_{B2}, \sout{C_{R0}}, \sout{C_{B4}}, \sout{C_{R4}}, \sout{C_{B6}}, C_{R2}, \sout{C_{R6}}, \ldots$ In the sixth example, "m" is equal to 5, and "n" is equal to 4. This example represents the case where an image of 640×480 pixels is reproduced from an original image of 800×600 pixels. This example also corresponds to the case where the above-indicated original image is reproduced as NTSC television signals.

As a result of this example, the original image can be displayed over substantially the entire area of the effective screen of NTSC television. Also, reproduction clock signals may be generated at 12.2727 MHz selected for NTSC square pixels.

In this example, C signals are rearranged in the order as indicated below. When reading out data from the memory, 8 pixels are picked out of 10 pixels of C signals by subsampling, and generated. The meanings of the left side and right side of the arrow are as explained with respect to the first example. The C signals are stored at horizontal addresses of the C memory 7 in the same order as indicated below.

$C_{B0}, C_{R0}, C_{B2}, C_{R2}, C_{B4}, C_{R4}, C_{B6}, C_{R6}, C_{B8}, C_{R8}, \ldots$ $\rightarrow \sout{C_{B0}}, \sout{C_{R0}}, C_{B4}, \sout{C_{B2}}, \sout{C_{R2}}, \sout{C_{B6}}, \sout{C_{R6}}, C_{R4}, \sout{C_{B8}},$
$\sout{C_{R8}}, \ldots$ In the seventh example, "m" is equal to 25, and "n" is equal to 24. This example represents the case where an image of 768×576 pixels is reproduced from an original image of 800×600 pixels. This example also corresponds to the case where the above-indicated original image is reproduced as PAL television signals.

As a result of this example, the original image can be displayed over substantially the entire area of the effective screen of PAL television. Also, reproduction clock signals may be generated at 14.7500 MHz selected for PAL square pixels.

In this example, C signals are rearranged in the order as indicated below. When reading out data, 48 pixels are picked out of 50 pixels of C signals by subsampling, and generated. The meanings of the left side and right side of the arrow are as explained with respect to the first example. The C signals are stored at horizontal addresses of the C memory 7 in the same order as indicated below.

$C_{B00}, C_{R00}, C_{B02}, C_{R02}, C_{B04}, C_{R04}, C_{B06}, C_{R06},$
$C_{B08}, C_{R08},$ $C_{B10}, C_{R10}, C_{B12}, C_{R12}, C_{B14}, C_{R14}, C_{B16}, C_{R16},$
$C_{B18}, C_{R18},$ $C_{B20}, C_{R20}, C_{B22}, C_{R22}, C_{B24}, C_{R24}, C_{B26}, C_{R26},$
$C_{B28}, C_{R28},$ $C_{B30}, C_{R30}, C_{B32}, C_{R32}, C_{B34}, C_{R34}, C_{B36}, C_{R36},$
$C_{B38}, C_{R38},$ $C_{B40}, C_{R40}, C_{B42}, C_{R42}, C_{B44}, C_{R44}, C_{B46}, C_{R46},$
$C_{B48}, C_{R48},$ $\rightarrow \sout{C_{B00}}, \sout{C_{R00}}, \sout{C_{B02}}, \sout{C_{R02}}, \sout{C_{B04}}, \sout{C_{R04}}, \sout{C_{B06}}, \sout{C_{R06}},$
$\sout{C_{B08}}, \sout{C_{R08}},$ $\sout{C_{B10}}, \sout{C_{R10}}, \sout{C_{B12}}, \sout{C_{R12}}, \sout{C_{B14}}, \sout{C_{R14}}, C_{B24}, \sout{C_{B16}},$
$\sout{C_{R16}}, \sout{C_{R18}},$ $\sout{C_{R18}}, \sout{C_{B20}}, \sout{C_{R20}}, \sout{C_{B22}}, \sout{C_{R22}}, \sout{C_{B26}}, \sout{C_{R26}}, \sout{C_{B28}},$
$\sout{C_{R28}}, \sout{C_{B30}},$ $\sout{C_{R30}}, \sout{C_{B32}}, \sout{C_{R32}}, C_{R24}, \sout{C_{B34}}, \sout{C_{R34}}, \sout{C_{B36}}, \sout{C_{R36}},$
$\sout{C_{B38}}, \sout{C_{R38}},$ $\sout{C_{B40}}, \sout{C_{R40}}, \sout{C_{B42}}, \sout{C_{R42}}, \sout{C_{B44}}, \sout{C_{R44}}, \sout{C_{B46}}, \sout{C_{R46}},$
$\sout{C_{B48}}, \sout{C_{R48}},$ As understood from the detailed descriptions provided above, the frame memory device of the first embodiment is constructed such that raster-scanned digital color image signals that are sequentially received from the video bus are rearranged in order and then stored in the memory, with the order of the rearrangement being determined so that during read-out, the signals precisely represent the input image that has been subsampled with horizontal and vertical addresses of the memory skipped at regular intervals. It is thus possible to readily subsample the image signals and output them as raster-scanned signals by use of the signal read-out means for reading out the signals while skipping the horizontal and vertical addresses of the memory at regular intervals. Accordingly, high-resolution image signals can be easily converted into and generated as normal television signals with lower resolution.

The frame memory device of the second embodiment is a combination of the conventional frame memory device for storing and reading out $YC_BC_R$ 4:2:2 image signals and the frame memory device of the first embodiment. In this device, $C_B$ and $C_R$ signals are rearranged by the above-described signal rearranging means in the order of $C_B \rightarrow C_B \rightarrow C_R \rightarrow C_R$, to be alternated at every other pixel, and then synchronized with Y signals, so that the Y and C signals are written into the memory in parallel with each other. It is therefore possible to output raster scanned signals that represent the original image that has been subsampled to one half both in the horizontal and vertical direction, by use of the subsampling and read-out means for reading out the Y and C signals in parallel with each other while skipping alternate ones of the horizontal and vertical addresses of the memory. In addition, since the $C_B$ and $C_R$ signals that have been subsampled to one half and read out are generated in the order of $C_B \rightarrow C_R$, the format of the input signals coincides with that of the output signals except that the input and output signals have different resolutions. This is advantageous in a system where the format of image signals is fixed. Further, since the address signals of Y memory and C memory can be derived from a common source, there is no need to increase the number of signal lines and the number of address generators. Thus, the desired frame memory device can be achieved without increasing the scale of circuits. Moreover, the rate or speed of reading out signals can be reduced in accordance with reduction in the resolution as a result of subsampling, thus making it easy to reduce the power consumption and ensure timing margins.

The frame memory device of the third embodiment employs the hardware of the frame memory device of the second embodiment, but is adapted to input and output signals in which the order of $C_B$ signals and $C_R$ signals on the C bus is exactly reversed with respect to that of the second embodiment. Accordingly, the present frame memory device can be applied to a system in which the $C_B$ signals and $C_R$ signals are multiplexed in the order of $C_R \rightarrow C_B$. It is only required to receive from the C bus signals that are multiplexed in the order of $C_R \rightarrow C_B$.

In the frame memory device of the fourth embodiment, the horizontal scan frequency and vertical scan frequency of raster-scanned $YC_BC_R$ 4:2:2 image signals that have been subsampled and output are equal to those of NTSC or PAL television signals. This is advantageous in the case where the television signals in the NTSC or PAL format are to be ultimately generated. Thus, image signals having higher resolution than that of NTSC or PAL television signals can be easily converted into and generated as NTSC or PAL television signals.

In the memory device of the fifth embodiment, horizontal and vertical addresses of a memory, such as a frame memory device, for storing image signals are respectively divided into a plurality of blocks each having a certain number (2m) of successive addresses as a unit. And the image signals in each block are subsampled by skipping addresses at predetermined intervals as precisely as possible, so that image signals corresponding to (2n) addresses are read out from the block.

Japanese application 08-042,513 filed Feb. 29, 1996, and Japanese application 09-25063 filed Feb. 7, 1997 are incorporated herein by reference.

While preferred embodiments of the invention have been shown and described, it will be apparent to those skilled in the art that changes can be made in these embodiments without departing from the principles and spirit of the invention, the scope of which is defined in the appended claims.

What is claimed is:

1. A frame memory device which sequentially receives raster-scanned digital color image signals, and sequentially stores the image signals in a memory having a two-dimensional address structure, such that vertical addresses represent the order of entry of respective scan lines that constitute said image signals and horizontal addresses represent the order of entry of respective signals that belong to each of the scan lines, and which sequentially reads out the stored signals from said memory so as to output the signals again as raster-scanned signals, said frame memory device being characterized by comprising:

signal rearranging means for rearranging the order of received signals to be stored in said memory; and subsampling and read-out means for reading out stored signals while skipping horizontal and vertical addresses of said memory at regular intervals, whereby the stored image signals that are subsampled are read out from said memory so as to output raster-scanned image signals at lower resolution than that of the received image signals, wherein the received image signals comprise $YC_BC_R$ color signals having a sampling ratio of 4:2:2, in which the number of horizontal pixels of $C_B$ and $C_R$ signals is equal to one half that of Y signals, and wherein the Y signals and the $C_B$ and $C_R$ signals are input and output in parallel with each other from a Y bus and a C bus, respectively, and the Y signals and $C_B$ and $C_R$ signals of a frame of said image signals are written into and read out from a Y memory and a C memory, respectively, constituting said memory, with the Y and C signals transmitted in parallel with each other, said $C_B$ and $C_R$ signals being multiplexed at alternate pixels and input and output from the C bus in the order of $C_B \rightarrow C_R$, and being characterized in that:

said signal rearranging means rearranges the $C_B$ and $C_R$ signals in the order of $C_B \rightarrow C_B \rightarrow C_R \rightarrow C_R$ to alternate the signals at every other pixel, and the $C_B$ and $C_R$ signals rearranged by said means are synchronized with the Y signals so that the Y and C signals are respectively written into said Y memory and said C memory in parallel with each other, and in that said subsampling and read-out means accesses alternate ones of horizontal and vertical addresses of said Y memory and C memory to read out the Y and C signals in parallel with each other, thereby to output raster-scanned $YC_BC_R$ image signals that have been subsampled to one half in both horizontal and vertical directions by said subsampling and read-out means.

2. A frame memory device according to claim 1, characterized in that horizontal scan frequency and vertical scan frequency of the image signals generated in a raster scanning scheme from the frame memory device are equal to those of NTSC or PAL television signals.

3. A frame memory device which sequentially receives raster-scanned digital color image signals, and sequentially stores the image signals in a memory having a two-dimensional address structure, such that vertical addresses represent the order of entry of respective scan lines that constitute said image signals and horizontal addresses represent the order of entry of respective signals that belong to each of the scan lines, and which sequentially reads out the stored signals from said memory so as to output the signals again as raster-scanned signals, said frame memory device being characterized by comprising:

signal rearranging means for rearranging the order of received signals to be stored in said memory; and subsampling and read-out means for reading out stored signals while skipping horizontal and vertical addresses of said memory at regular intervals, whereby the stored image signals that are subsampled are read out from said memory so as to output raster-scanned image signals at lower resolution than that of the received image signals, wherein the received image signals comprise $YC_BC_R$ color signals having a sampling ratio of 4:2:2, in which the number of horizontal pixels of $C_B$ and $C_R$ signals is equal to one half that of Y signals, and wherein the Y signals and the $C_B$ and $C_R$ signals are input and output in parallel with each other from a Y bus and a C bus, respectively, and the Y signals and $C_B$ and $C_R$ signals of a frame of said image signals are written into and read out from a Y memory and a C memory, respectively, constituting said memory, with the Y and C signals transmitted in parallel with each other, said $C_B$ and $C_R$ signals being multiplexed at alternate pixels and input and output from the C bus in the order of $C_R \rightarrow C_B$, and being characterized in that:

said signal rearranging means rearranges the $C_B$ and $C_R$ signals in the order of $C_R \rightarrow C_R \rightarrow C_B \rightarrow C_B$ to alternate the signals at every other pixel, and the $C_B$ and $C_R$ signals rearranged by said means are synchronized with the Y signals so that the Y and C signals are respectively written into said Y memory and said C memory in parallel with each other, and in that said subsampling and read-out means accesses alternate ones of horizontal and vertical addresses of said Y memory and C memory to read out the Y and C signals in parallel with each other, thereby to output raster-scanned $YC_BC_R$ image signals that have been subsampled to one half in both horizontal and vertical directions by said subsampling and read-out means.

4. A frame memory device according to claim 3, characterized in that horizontal scan frequency and vertical scan frequency of the image signals generated in a raster scanning scheme from the frame memory device are equal to those of NTSC or PAL television signals.

5. A method of outputting raster-scanned digital color image signals at lower resolution than that of sequentially received raster-scanned digital color image signals, comprising:

rearranging the order of received signals;

sequentially storing the rearranged signals in a memory having a two-dimensional address structure, such that vertical addresses represent the order of entry of respective scan lines that constitute the received image signals and horizontal addresses represent the order of entry of respective signals that belong to each of the scan lines; and subsampling and reading out stored signals while skipping horizontal and vertical addresses of said memory at regular intervals;

wherein the rearranging and subsampling are correlated so as to output raster-scanned image signals at lower resolution than that of the received image signals, wherein the received image signals comprise $YC_BC_R$ color signals having a sampling ratio of 4:2:2, in which the number of horizontal pixels of $C_B$ and $C_R$ signals is equal to one half that of Y signals, and wherein the Y signals and the $C_B$ and $C_R$ signals are input and output in parallel with each other from a y bus and a C bus, respectively, and the Y signals and $C_B$ and $C_R$ signals of a frame of said image signals are written into and read out from a Y memory and a C memory, respectively, constituting said memory, with the Y and C signals transmitted in parallel with each other, and wherein the $C_B$ and $C_R$ signals are multiplexed at alternate pixels and input and output from the C bus in the order of $C_B \rightarrow C_R$ and the received $C_B$ and $C_R$ signals are rearranged in the order of $C_B \rightarrow C_B \rightarrow C_R \rightarrow C_R$ to alternate the signals at every other pixel, and the rearranged $C_B \rightarrow C_R$ signals are synchronized with the Y signals so that the Y and C signals are respectively written into said Y memory and said C memory in parallel with each other, and wherein the subsampling and reading out accesses alternate ones of horizontal and vertical addresses of said Y memory and C memory to read out the Y and C signals in parallel with each other, thereby to output raster-scanned $YC_BC_R$ image signals that have been subsampled to one half in both horizontal and vertical directions.

6. A method according to claim 5, wherein signals are read out from said memory in a raster-scanning scheme having horizontal and vertical scan frequencies equal to those of NTSC or PAL television signals.

7. A method of outputting raster-scanned digital color image signals at lower resolution than that of sequentially received raster-scanned digital color image signals, comprising:

rearranging the order of received signals;

sequentially storing the rearranged signals in a memory having a two-dimensional address structure, such that vertical addresses represent the order of entry of respective scan lines that constitute the received image signals and horizontal addresses represent the order of entry of respective signals that belong to each of the scan lines; and subsampling and reading out stored signals while skipping horizontal and vertical addresses of said memory at regular intervals;

wherein the rearranging and subsampling are correlated so as to output raster-scanned image signals at lower resolution than that of the received image signals, wherein the received image signals comprise $YC_BC_R$ color signals having a sampling ratio of 4:2:2, in which the number of horizontal pixels of $C_B$ and $C_R$ signals is equal to one half that of Y signals, and wherein the Y signals and the $C_B$ and $C_R$ signals are input and output in parallel with each other from a y bus and a C bus, respectively, and the Y signals and $C_B$ and $C_R$ signals of a frame of said image signals are written into and read out from a Y memory and a C memory, respectively, constituting said memory, with the Y and C signals transmitted in parallel with each other, and wherein the $C_B$ and $C_R$ signals are multiplexed at alternate pixels and input and output from the C bus in the order of $C_R \rightarrow C_B$ and the received $C_B$ and $C_R$ signals are rearranged in the order of $C_R \rightarrow C_R \rightarrow C_B \rightarrow C_B$ to alternate the signals at every other pixel, and the rearranged $C_R \rightarrow C_B$ signals are synchronized with the Y signals so that the Y and C signals are respectively written into said Y memory and said C memory in parallel with each other, and wherein the subsampling and reading out accesses alternate ones of horizontal and vertical addresses of said Y memory and C memory to read out the Y and C signals in parallel with each other, thereby to output raster-scanned $YC_BC_R$ image signals that have been subsampled to one half in both horizontal and vertical directions.

8. A method according to claim 7, wherein signals are read out from said memory in a raster-scanning scheme having horizontal and vertical scan frequencies equal to those of NTSC or PAL television signals.

* * * * *